US012755149B2

(12) United States Patent
Au et al.

(10) Patent No.: US 12,755,149 B2
(45) Date of Patent: Oct. 6, 2026

(54) GRAPH REDUCTION FOR EXPLAINABLE ARTIFICIAL INTELLIGENCE

(71) Applicant: Fujitsu Limited, Kawasaki (JP)

(72) Inventors: Wing Au, Saratoga, CA (US); Kanji Uchino, Santa Clara, CA (US)

(73) Assignee: Fujitsu Limited, Kawasaki (JP)

( * ) Notice: Subject to any disclaimer, the term of this patent is extended or adjusted under 35 U.S.C. 154(b) by 618 days.

(21) Appl. No.: 18/177,789

(22) Filed: Mar. 3, 2023

(65) Prior Publication Data

US 2024/0296323 A1 Sep. 5, 2024

(51) Int. Cl.
*G06N 3/08* (2023.01)

(52) U.S. Cl.
CPC .................................... *G06N 3/08* (2013.01)

(58) Field of Classification Search
CPC G06N 3/08; G06N 5/045; G06N 3/09; G06N 5/022; G06N 3/042
See application file for complete search history.

(56) References Cited

U.S. PATENT DOCUMENTS 11,228,505 B1 1/2022 Wang et al.

OTHER PUBLICATIONS

Sun et al., "Sugar: Subgraph neural network with reinforcement pooling and self-supervised mutual information mechanism", May 24, 2021, In Proceedings of the web conference 2021, (pp. 2081-2091) (Year: 2021).*

Luo et al., "Parameterized explainer for graph neural network.", Nov. 9, 2020, Advances in neural information processing systems 33, 19620-19631 (Year: 2020).*

Liu et al., "Graph Neural Network for Credit Card Fraud Detection," Dec. 20, 2021, 2021 International Conference on Cyber-Physical Social Intelligence (ICCSI), pp. 1-6 (Year: 2021).*

Yuan, Hao et al., "Explainability in Graph Neural Networks: A Taxonomic Survey", Dec. 31, 2020, pp. 1-14, Cornell University Library, 201 Olin Library Cornell University Ithaca, NY 14853, XP081849357.

(Continued)

*Primary Examiner* — Kakali Chaki

(74) *Attorney, Agent, or Firm* — Fujitsu Intellectual Property Center

(57) ABSTRACT

In an embodiment, operations include receiving a graph representative of a domain. The operations further include extracting first sub-graphs from the graph and reducing each first sub-graph to obtain a set of reduced sub-graphs. The operations further include executing a set of operations comprising: determining a closest reduced sub-graph, from the set of reduced sub-graphs, corresponding to each first sub-graph; determining coverage metrics based on the extracted first sub-graphs and the closest reduced sub-graph corresponding to each first sub-graph; determining whether the coverage metrics satisfy coverage conditions; and re-iterating reduction of the extracted first sub-graphs if the coverage metrics do not satisfy the coverage conditions. The operations further include obtaining second sub-graphs from the closest reduced sub-graph corresponding to each first sub-graph based on repetition of the first set of operations until the coverage metrics satisfy the coverage conditions and training an explainable prediction model based on the second sub-graphs.

15 Claims, 12 Drawing Sheets

(56) References Cited

OTHER PUBLICATIONS

Guerra, Michele et al., "Explainability in subgraphs-enhanced Graph Neural Networks", ARXIV.ORG, Cornell University Library, 201 Olin Library Cornell University Ithaca, NY 14853M Sep. 16, 2022, XP091319481.

European Search Report dated Jul. 9, 2024 for corresponding European Patent Application No. 24158551.2, 8 pages.

Fu, Xinyu, Jiani Zhang, Ziqiao Meng, and Irwin King. "Magnn: Metapath aggregated graph neural network for heterogeneous graph embedding." In Proceedings of The World Wide Web Conference 2020. 2020. arXiv:2002.01680v2 [cs.SI] Mar. 31, 2020.

Gilmer, Justin, Samuel S. Schoenholz, Patrick F. Riley, Oriol Vinyals, and George E. Dahl. "Neural message passing for quantum chemistry." In International conference on machine learning. PMLR, 2017. arXiv:1704.01212v2 [cs.LG] Jun. 12, 2017.

Grover, Aditya, and Jure Leskovec. "node2vec: Scalable feature learning for networks." In Proceedings of the 22nd ACM SIGKDD international conference on Knowledge discovery and data mining 2016.arXiv:1607.00653v1 [cs.SI] Jul. 3, 2016.

Hu, Ziniu, Yuxiao Dong, Kuansan Wang, and Yizhou Sun. "Heterogeneous graph transformer." In Proceedings of the web conference 2020. 2020. arXiv:2003.01332v1 [cs.LG] Mar. 3, 2020.

Kipf, Thomas N., and Max Welling. "Semi-supervised classification with graph convolutional networks." (2017). arXiv:1609.02907v4 [cs.LG] Feb. 22, 2017.

Liu, Meng, and Shuiwang Ji. "Neighbor2seq: Deep learning on massive graphs by transforming neighbors to sequences." In Proceedings of the 2022 SIAM International Conference on Data Mining (SDM), pp. 55-63. Society for Industrial and Applied Mathematics, 2022. arXiv:2202.03341v1 [cs.LG] Feb. 7, 2022.

* cited by examiner

GRAPH REDUCTION FOR EXPLAINABLE ARTIFICIAL INTELLIGENCE

FIELD

The embodiments discussed in the present disclosure are related to graph reduction for explainable artificial intelligence.

BACKGROUND

Advancements in the field of graph machine learning have led to application of graph neural networks for classification tasks on nodes and edges of a continuous graph. A node classification task in machine learning may be performed to predict information associated with nodes of the continuous graph. Similarly, a regression task may be performed on the continuous graph such that continuous valued labels (instead of discrete valued labels) may be determined for the nodes of the continuous graph. The information or the labels may be predicted based on application of a trained graph neural network on information associated with a set of nodes of the continuous graph that may be neighbors of a particular target node. The information associated with the neighboring nodes may be extracted from the continuous graph for training, testing, and inference, of the graph neural network. Typically, the graph neural network may be trained based on units of information that may be associated with the neighboring nodes of the continuous graph or a topological structure of the neighboring nodes. The units of information may be represented as vectors generated based on summarization of the extracted information. The training of the graph neural network using the vectors may not be accurate, in case, the summarization does not represent information associated with all neighboring nodes of a target node or nodes farther away from the target node. Further, the topological structure of the continuous graph structure around the target node may not be used for the generation of the vectors representing the summarized information. The topological structure may be critical for efficient graph-based downstream machine learning.

To use the topological structure of the neighboring nodes for the training, a plurality of subgraphs may be extracted from the continuous graph that may include all neighboring nodes and edges emanating from the target node. The information obtained from such extracted subgraphs may be used to train the graph neural network. However, an expansion of a neighborhood associated with a target node may lead to an explosive increase in a number of nodes in a subgraph associated with the target node. The number of nodes may increase due to an increment in a number of hops from the target node. The increment may lead to an exponential increase (with a base of number of nodes) in the number of neighboring nodes. The increased number of neighboring nodes may introduce additional computations that may be required to be performed during the training. Such additional computations may require substantial memory and/or processing capability constraints of devices that store the graph neural network. Thus, the complexity and resources required for execution of graph machine learning tasks on the subgraphs may be increase due to the neighborhood explosion issue.

To utilize information associated with all the neighboring nodes of a target node for training the graph neural network, information associated with a sample of neighboring nodes may be aggregated. The aggregated information may be used for iterative training of the graph neural network. Though, the training accuracy of the graph neural network may improve after each iteration, however, there may be a tradeoff between the number of iterations and latency of the training process. Higher accuracy may require a large number of iterations and thereby may increase the latency of the training process.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include a set of operations, which may include receiving a graph representative of a domain, and a label associated with each node of a set of nodes of the received graph. The set of operations may further include extracting a set of first sub-graphs from the received graph. The set of operations may further include reducing each first sub-graph of the extracted set of first sub-graphs to obtain a set of reduced sub-graphs corresponding to each first sub-graph of the extracted set of first sub-graphs. The set of operations may further include executing a first set of operations to obtain a set of second sub-graphs from the extracted set of first sub-graphs, based on the reduction of each first sub-graph of the extracted set of first sub-graphs. The first set of operations may include determining a closest reduced sub-graph, from the set of reduced sub-graphs, corresponding to each first sub-graph of the extracted set of first sub-graphs. The first set of operations may further include determining a set of coverage metrics based on the determined closest reduced sub-graph corresponding to each first sub-graph of the extracted set of first sub-graphs and the extracted set of first sub-graphs. The first set of operations may further include determining whether the determined set of coverage metrics satisfy a set of coverage conditions. The first set of operations may further include re-iterating reduction of the extracted set of first sub-graphs to obtain the set of reduced sub-graphs, based on the determination that the determined set of coverage metrics does not satisfy the set of coverage conditions. The set of operations may further include obtaining the set of second sub-graphs from the determined closest reduced sub-graph corresponding to each first sub-graph of the extracted set of first sub-graphs, based on an iterative control of the execution of the first set of operations until the determined set of coverage metrics satisfy the set of coverage conditions. The set of operations may further include training a graph machine learning model based on the obtained set of second sub-graphs and the received label associated with each node of the set of nodes of the received graph.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

Figure 1:
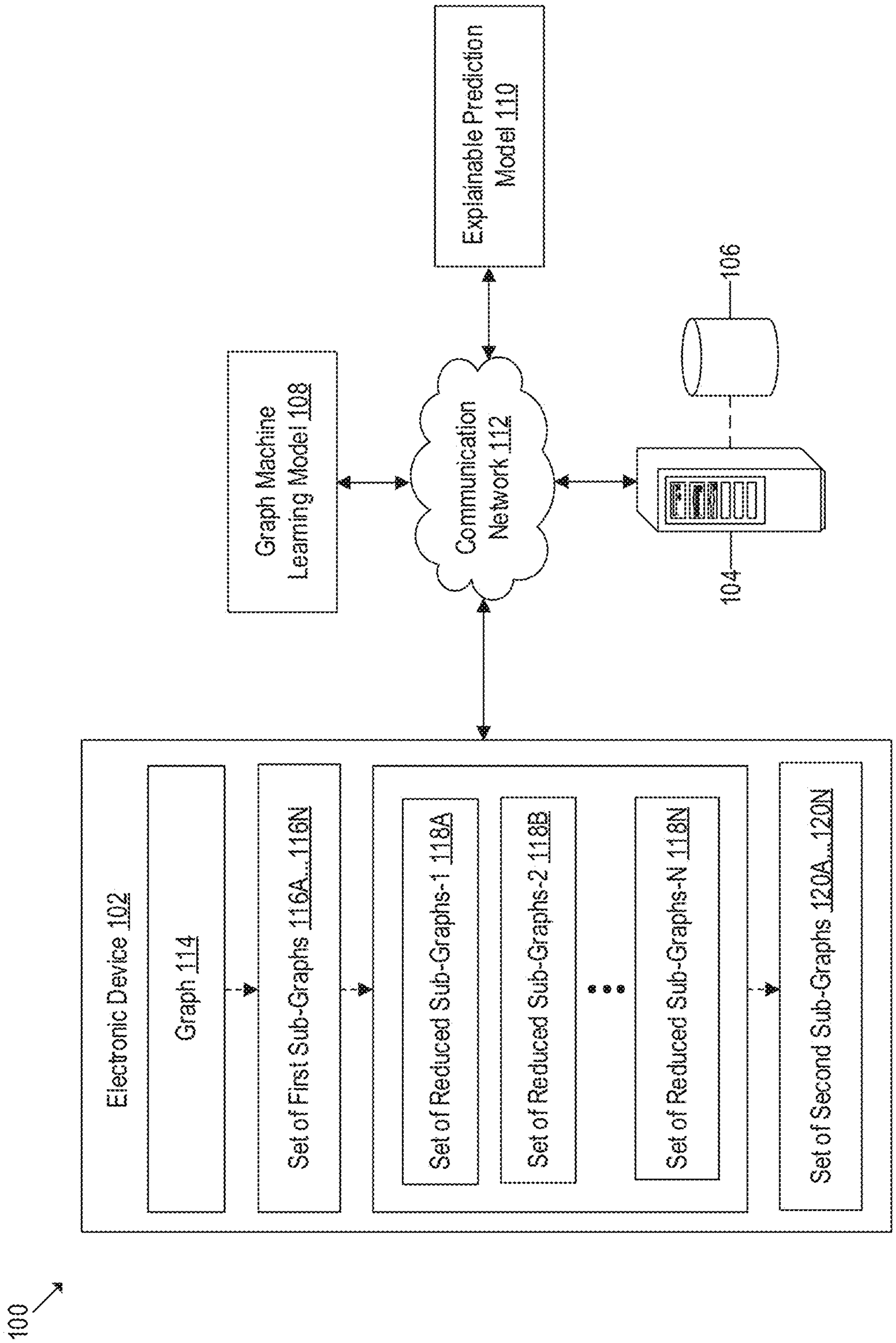
FIG. 1 is a diagram representing an example network environment related to graph reduction for explainable artificial intelligence (XAI)

all according to at least one embodiment described in the present disclosure.

DESCRIPTION OF EMBODIMENTS

Some embodiments described in the present disclosure relate to methods and systems for reduction of a graph for explainable artificial intelligence. Herein, the reduction of the graph may involve extraction of a plurality of sub-graphs from the graph. Further, a set of reduced subgraphs may be obtained for each of the plurality of sub-graphs and a closest reduced subgraph may be determined from each set of reduced subgraphs. The closed reduced subgraph may be used to enable a graph explainable artificial intelligence (GXAI) engine to create an explainable prediction model that may be configured to make predictions on graph data. In the present disclosure, a graph representative of a domain (for example, a financial fraud detection domain or a citation network domain) may be received. Further, a label associated with each node of a set of nodes of the received graph may also be received. Further, a set of first sub-graphs may be extracted from the received graph. Each first sub-graph of the extracted set of first sub-graphs may be reduced to obtain a set of reduced sub-graphs. Thereafter, a first set of operations may be executed on each set of reduced sub-graphs corresponding to a first sub-graph of the extracted set of first sub-graphs. The set of operations may be executed to obtain a set of second sub-graphs. The first set of operations include a determination of a closest reduced sub-graph from each set of reduced sub-graphs. The first set of operations may further include a determination of a set of coverage metrics based on the set of first sub-graphs and the closest reduced sub-graph determined from each set of reduced sub-graphs. The first set of operations may further include determination of whether the determined set of coverage metrics satisfy a set of coverage conditions. The first set of operations may further include re-iteration of the reduction of the set of first sub-graphs to reobtain the set of reduced sub-graphs for each first sub-graph, based on the determination that the set of coverage metrics does not satisfy the set of coverage conditions. The set of second sub-graphs may be obtained from the closest reduced sub-graph determined from each set of reduced sub-graphs. The set of second sub-graphs may be obtained based on an iterative control of the execution of the first set of operations until the determined set of coverage metrics satisfy the set of coverage conditions. Finally, a graph machine learning model (for example, the GXAI engine) may be trained based on the obtained set of second sub-graphs and the received label associated with each node of the set of nodes of the received graph.

Node classification on a continuous graph may be a graph-based machine learning task that may be performed using a multi-layered trained graph neural network model for a target node in the continuous graph. Similarly, a regression task may be performed on the continuous graph such that continuous valued labels (instead of discrete valued labels) may be determined for the nodes of the continuous graph. Typically, the graph neural network model may be trained based on information associated with a set of nodes of the continuous graph that may be neighbors of the target node. The graph neural network model may be trained further based on or a topological structure of the set of nodes (i.e., the neighboring nodes). The trained graph neural network model may predict properties of other nodes of the continuous graph. A prediction accuracy of the graph neural network model may be dependent on training data and how the training data is obtained.

To train the graph neural network model, the information associated with the neighboring nodes may be extracted from the continuous graph. The extraction may be based on a summarization of the information associated with the neighboring nodes into multiple units of information that may be represented as vectors. The vectors may be used during a training phase, a test phase, or an inference phase associated with the graph neural network model. In a first scenario, the summarization of the information may be achieved based on random walks, which may be initiated from the target node. The random walks may involve collection of information associated with neighboring nodes situated in a walk path along the continuous graph. However, in some cases, it may not be possible to ensure coverage of all neighboring nodes in the walk path. In a second scenario, the information associated with the neighboring nodes may be aggregated for the summarization of the information. It may be observed that based on a result of the aggregation, the information associated with neighboring nodes, which are farther from the target node may be diluted. A lack of coverage of all neighboring nodes or a dilution of information associated with neighboring nodes that are farther away from the target node may negatively impact a training accuracy or a prediction accuracy of the graph neural network model.

In both the above scenarios, the topological structure of the neighboring nodes may be lost due to the summarization. The topological structure may be invaluable for a downstream task based on graph machine learning. To retain and use the topological structure of the neighboring nodes (for training the graph neural network model), a number of sub-graphs may be extracted from the continuous graph. The subgraphs may include all neighboring nodes of the target node. Extraction of sub-graphs may, however, lead to a neighborhood explosion issue, particularly if a hop count from the target node is increased. For example, if the hop count is incremented by "1", to include nodes that may be in a level subsequent to that the neighboring nodes (with respect to the target node), a count of neighboring nodes or a count of nodes in an extracted sub-graph may increase exponentially. The increase in the count of nodes in a sub-graph may require performance of additional computations during the training phase of the graph neural network model. Due to the such requirements, it may not be feasible to perform multi-hop extraction-based (or sub-graph based) graph machine learning beyond a certain hop-level on devices that may be constrained based on memory and/or processing capability.

The requirement additional computation during the training phase may be avoided by prior analysis and computation based on a topological structure of the neighboring nodes. The analysis and computation may result in generation of vector representations that may include information associated with the neighboring nodes that may be grouped based on the count of hops and may be used for training the graph neural network. However, the vector representations may not capture the topological structure of the neighboring nodes accurately in certain scenarios. An example of such a scenario may be when multiple edges emanate from a node which is a number of hops away from the target node. Further, the generation of the vector representations may prohibit an application of explainable artificial intelligence as downstream machine learning tasks.

To ensure that information associated with all or a representative set of neighboring nodes are used for training of the graph neural network model, the information associated with a sample of neighboring nodes may be aggregated and the aggregated information may be used to train the graph neural network model in a particular training iteration. Thus, the graph neural network model may be trained based on the information associated with all of the neighboring nodes in a plurality of training iterations. Herein, the training accuracy or the prediction accuracy may be proportional to a count of iterations in the plurality of training iterations, while training latency may be inversely proportional to the count of training iterations. Thus, there may be trade-off between the prediction (or training) accuracy and training latency, which may not be desirable.

According to one or more embodiments of the present disclosure, the technological field of sub-graph based machine learning on massive continuous graphs may be improved by configuring a computing system (e.g., an electronic device) in a manner that the computing system may be able to scale an input massive continuous graph including, for example, millions of nodes and edges, into manageable sub-graph units. For example, the continuous graph may represent data and relationships between data associated with domains such as citation networks, social media, or financial transactions. The computing system may extract such sub-graph units from the input continuous graph, which may facilitate performance of graph-based machine learning on the individual units (i.e., the extracted subgraphs) of the continuous graph. The computing system may convert graph data represented in the extracted sub-graphs into a format (where graph data may be represented as reduced sub-graphs closest to the extracted sub-graphs) suitable for training a GXAI pipeline. The GXAI pipeline may include a GXAI engine and an explainable prediction model. The GXAI pipeline may be optimized to learn a graph structure and attributes of the continuous graph based on the formatted data to achieve a desirable prediction accuracy and generate results that may be explainable.

The computing system may extract information associated with nodes of the input continuous graph that may be a predefined number of hops away from a target node to extract a set of sub-graphs. The extraction of the set of sub-graphs may boost training accuracy and prediction accuracy of the GXAI pipeline since the extraction may allow usage of long-range information for training the GXAI pipeline and performing a node-classification machine learning task using the GXAI pipeline for predicting graph data. The long-range information may be obtained by setting the predefined number of hops to a higher value such that nodes further from the target node may be included in the sub-graph. Further, the extraction of the sub-graphs may alleviate the neighborhood explosion issue, since a number of nodes included in each sub-graph may be controlled by setting the number of hops to a manageable value. Further, a training dataset associated with each sub-graph may be of varying fanout and complexity. The extraction of the sub-graphs may further enable preservation of the topological structure (of the input continuous graph), which may facilitate generation of an accurate downstream graph-based machine learning using the GXAI pipeline. The usage of the set of sub-graphs (instead of vector representations of graph information) may enable graph machine learning directly on the graph structure (of the input continuous graph) which may allow an improvement of the prediction accuracy of the GXAI pipeline. Training the GXAI pipeline based on information obtained from extracted sub-graphs may allow the GXAI pipeline to provide node, edge, or motif-based, explanations for each prediction and also avoid a non-transparent black-box behavior.

Based on a graph size target and a set of hyperparameters (associated with the graph reduction), the computing system may reduce the size of each extracted sub-graph into a corresponding set of reduced sub-graphs. The computing system may further rank reduced sub-graphs of each set of reduced sub-graphs. Further, the computing system may determine, from each set of reduced sub-graphs based on the rank, a closest reduced sub-graph with properties that may be a best match for a corresponding extracted subgraph. Therefore, a set of closest reduced sub-graphs, that are faithful to the corresponding set of extracted sub-graphs, may be determined. The determination of the set of closest reduced sub-graphs may minimize information associated with neighboring nodes of the target node that may be lost during the reduction of the set of extracted graphs. The minimization of information loss may result in an improvement of the prediction accuracy of the GXAI pipeline. The closest reduced sub-graphs may be in a format that may be suitable for the downstream sub-graph-based machine learning using the GXAI pipeline.

The computing system may further determine, based on coverage thresholds, whether the set of closest reduced subgraphs corresponding to the set of extracted sub-graphs include sufficient information associated with the set of extracted sub-graphs. Based on a determination that sufficient information is included in each closest reduced sub-graph of the set of closest reduced sub-graphs, the computing system may use the set of closest reduced subgraphs for the downstream graph-based machine learning.

Embodiments of the present disclosure are explained with reference to the accompanying drawings.

FIG. 1 is a diagram representing an example network environment related to graph reduction for explainable Artificial Intelligence (XAI), according to at least one embodiment described in the present disclosure. With reference to FIG. 1, there is shown a network environment 100. The network environment 100 may include an electronic device 102, a server 104 (that may host a database 106), a graph machine learning model 108, and an explainable prediction model 110. The electronic device 102, the server 104, the graph machine learning model 108, and the explainable prediction model 110, may be communicatively coupled to one another, via a communication network (such as the communication network 112).

The electronic device 102 may include suitable logic, circuitry, interfaces, and/or code that may be configured to receive an input continuous graph (for example, a graph 114), and extract a set of first sub-graphs 116A . . . 116N from the input continuous graph (i.e., the graph 114). Further, the electronic device 102 may obtain a set of reduced sub-graphs (such as, a set of reduced sub-graphs-1 118A) based on a reduction of each first sub-graph (such as, a first sub-graph 116A) of the extracted set of first sub-graphs 116A . . . 116N. Thereafter, the electronic device 102 may determine a closest reduced sub-graph from each set of reduced sub-graphs, and obtain a set of second sub-graphs 120A . . . 120N from the closest reduced sub-graph determined from each set of reduced sub-graphs. The electronic device 102 may be further configured to train a graph machine learning model 108 based on the set of second sub-graphs 120A . . . 120N for prediction on graph data. In an embodiment, the electronic device 102 may generate an explainable prediction model 110 based on the training of the graph machine learning model 108. The explainable prediction model 110 may be used for explainable predictions on graph data. Examples of the electronic device 102 may include, but may not be limited to, a computing device, a smartphone, a mainframe machine, a server, a computer workstation, a consumer electronic (CE) device, and/or any device with a graph-processing capability (such as, a device with a set of graphic processor units (GPU)).

The server 104 may include suitable logic, circuitry, and interfaces, and/or code that may be configured to receive requests from the electronic device 102 for the graph 114. The server 104 may be further configured to retrieve the graph 114 from the database 106 and transmit the retrieved graph 114 to the electronic device 102. In at least one embodiment, the server 104 may receive the graph 114 from the electronic device 102 and may generate and transmit the set of second sub-graphs 120A . . . 120N to the electronic device 102, based on the reception of the graph 114 from the electronic device 102. In other embodiments, the server 104 may be configured to train the graph machine learning model 108 and generate explainable graph machine learning models (such as, the explainable prediction model 110) that may be used for prediction on graph data. The server 104 may be implemented as a cloud server and may execute operations through web applications, cloud applications, hypertext transport protocol (HTTP) requests, repository operations, file transfer, and the like. Other example implementations of the server 104 may include, but are not limited to, a database server, a file server, a web server, a media server, an application server, a mainframe server, a cloud computing server, and/or any device with a graph-processing capability (such as, a device with a set of graphic processor units (GPU)).

In at least one embodiment, the server 104 may be implemented as a plurality of distributed cloud-based resources by use of several technologies that may be well known to those ordinarily skilled in the art. A person with ordinary skill in the art will understand that the scope of the disclosure may not be limited to the implementation of the server 104 and the electronic device 102 as two separate entities. In certain embodiments, the functionalities of the server 104 can be incorporated in its entirety or at least partially in the electronic device 102, without a departure from the scope of the disclosure.

The database 106 may include suitable logic, circuitry, interfaces, and/or code that may be configured to store continuous graphs (such as, the graph 114) representative of various domains (such as, a finance domain, a credit card fraud detection domain, a social media domain, an electronic-commerce domain, or a citation network domain). In an embodiment, the database 106 may be further configured to store the graph machine learning model 108 and/or the explainable prediction model 110. The database 106 may be derived from data off a relational or non-relational database, or a set of comma-separated values (csv) files in a conventional storage or a big-data storage. The database 106 may be stored or cached on a device, such as, a server 104 or the electronic device 102. The device storing the database 106 may be configured to receive a query for the graph 114. In response, the device storing the database 106 may be configured to retrieve and provide the graph 114 to the electronic device 102. In accordance with an embodiment, the database 106 may be hosted on a plurality of servers stored at same or different locations. The operations of the database 106 may be executed using hardware including a processor, a microprocessor (for example, to perform or control performance of one or more operations), a field-programmable gate array (FPGA), or an application-specific integrated circuit (ASIC). In some other instances, the database 106 may be implemented using software.

The graph machine learning model 108 may include suitable logic, circuitry, interfaces, and/or code that may configured to execute graph machine learning tasks (such as, a node classification task or a regression task) on an input sub-graph data. In accordance with an embodiment, the graph machine learning model 108 may correspond to a Graph explainable Artificial Intelligence (GXAI) engine that may use the determined closest reduced sub-graphs corresponding to each of the extracted first sub-graph of the set of first sub-graphs 116A . . . 116N for scalable batchwise graph machine learning. The GXAI engine may correspond to a deep tensor that may use deep learning to enable machine learning on graph-structured data such as, the set of second sub-graphs 120A . . . 120N (i.e., the closest reduced sub-graphs corresponding to the set of first sub-graphs 116A . . . 116N extracted from the input continuous graph 114). The deep tensor may convert training graph data (for example, the second sub-graph 120A) into a tensor for extraction of graph-data features. The extraction may involve a conversion of the tensor into a uniform tensor representation using tensor decomposition. The uniform tensor representation may be input to the explainable prediction model 110. The uniform tensor representation may facilitate extraction of data features, from the training graph data, that may significantly contribute to an inference result (which may be obtained based on an application of the explainable prediction model 110 on the input sub-graph). The deep tensor (associated with the GXAI engine) may further establish a correspondence between the extracted features and the input sub-graph to generate information representative of a set of connections between nodes of a graph (from which the input sub-graph may be extracted). The correspondence may enable an understanding of machine learning results that may be obtained based on the application of the explainable prediction model 110 on the input sub-graph. In an embodiment, the graph machine learning model 108 may be stored on one of the electronic device 102, the server 104, or the database 106. The graph machine learning model 108 may be implemented using hardware including a processor, a microprocessor (e.g., to perform or control performance of one or more operations), a field-programmable gate array (FPGA), or an application-specific integrated circuit (ASIC). In some other instances, the graph machine learning model 108 model may be a code, a program, or set of software instruction. The graph machine learning model 108 model may be implemented using a combination of hardware and software.

The explainable prediction model 110 may include suitable logic, circuitry, interfaces, and/or code that may configured to classify or analyze input graph data to generate an output result (prediction) for a particular real-time application (such as, a graph node classification task or graph regression task). For example, the explainable prediction model 110 may be a trained graph neural network model that may recognize different types of nodes edges between each node in the input graph data. The edges may correspond to different connections or relationship between each node in the input graph data. Based on the recognized nodes and edges, the explainable prediction model 110 may classify different nodes within the input graph data into different labels or classes, and generate explanations that may be used to understand, explain, or provide reason(s) for the classification. In an example, a particular node of the input graph data may include a set of features associated therewith. Further, each edge may connect with different nodes having similar set of features. The electronic device 102 may be configured to encode the set of features to generate a feature vector using the explainable prediction model 110. After the encoding, information may be passed between the particular node and the neighboring nodes connected through the edges. Based on the information passed to the neighboring nodes, a final vector may be generated for each node. Such final vector may include information associated with the set of features for the particular node as well as the neighboring nodes, thereby providing reliable and accurate information associated with the particular node. As a result, the explainable prediction model 110 may analyze the information represented as the input graph data and provide reasons behind a certain prediction result on the input graph data. In an embodiment, the explainable prediction model 110 may be stored on one of the electronic device 102, the server 104, or the database 106. The explainable prediction model 110 may be implemented using hardware including a processor, a microprocessor (e.g., to perform or control performance of one or more operations), a field-programmable gate array (FPGA), or an application-specific integrated circuit (ASIC). In some other instances, the explainable prediction model 110 model may be a code, a program, or set of software instruction. The explainable prediction model 110 model may be implemented using a combination of hardware and software.

In some embodiments, the graph machine learning model 108 and/or the explainable prediction model 110 may correspond to a machine learning model (e.g., a neural network model) with multiple classification layers for classification of different nodes in the input graph data, where each successive layer may use an output of a previous layer as input. Each classification layer may be associated with a plurality of edges, each of which may be further associated with plurality of weights. During training, the graph machine learning model 108 and/or explainable prediction model 110 may be configured to filter or remove the edges or the nodes based on the input graph data and further provide an output result (i.e., a graph representation). Examples of the graph machine learning model 108 and/or the explainable prediction model 110 may include, but are not limited to, a graph convolution network (GCN), a Graph Spatial-Temporal Networks with GCN, a recurrent neural network (RNN), a deep Bayesian neural network, and/or a combination of such networks.

The communication network 112 may include a communication medium via which the electronic device 102, the server 104, the database 106, the graph machine learning model 108, and the explainable prediction model 110 may communicate with each other. The communication network 112 may be one of a wired connection or a wireless connection. Examples of the communication network 112 may include, but are not limited to, the Internet, a cloud network, a Cellular or Wireless Mobile Network (such as, Long-Term Evolution and 5G New Radio), a satellite network (such as, a network of a set of low-earth orbit satellites), a Wireless Fidelity (Wi-Fi) network, a Personal Area Network (PAN), a Local Area Network (LAN), or a Metropolitan Area Network (MAN). Various devices in the network environment 100 may be configured to connect to the communication network 112 in accordance with various wired and wireless communication protocols. Examples of the wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the electronic device 102 may be configured to receive a graph (for example, the graph 114) representative of a domain, and a label associated with each node of a set of nodes of the received graph 114. In some embodiments, the graph 114 may be received from the server 104 or the database 106 (via the server 104). The graph 114 may be a knowledge graph that may include a set of nodes and a set of edges connecting each node of the set of nodes with other nodes. Each node of the set of nodes may be representative of entities of the domain and each edge between any two nodes of the set of nodes may be indicative of a relationship between two entities represented by the two nodes. The graph 114 may be representative of a finance domain, a credit card fraud detection domain, an electronic commerce domain, a social network domain, or a citation network domain. For example, a knowledge graph (i.e., the graph 114) representative of a citation network domain may include nodes that may represent an author of a research work, a research work, or a venue where the research work is presented or published. The edges of the knowledge graph may represent authorship relationships (between an author of a research work and the research work) or publication relationships (between a research work or a venue where the research work has been presented).

The electronic device 102 may be further configured to extract the set of first sub-graphs 116A . . . 116N from the received graph 114. The extraction may be based on at least one of a hop limit, a node-type associated with nodes of the received graph 114, or a combination of the hop limit and the node-type. The nodes of the received graph 114 may be identified training nodes or test nodes. The training nodes may be referred as extract-nodes. A training node may be associated with a set of test nodes. The test nodes may be referred as non-extract-nodes. Each first sub-graph of the set of first sub-graphs 116A . . . 116N may be extracted around an extract-node. Thus, a count of extract-nodes identified in the graph 116 may be equal to a count of first sub-graphs of the set of first sub-graphs 116A . . . 116N to be extracted from the graph 114. The electronic device 102 may set a hop limit (for example, "k") for selection of nodes of the graph 114 that may be identified as non-extract-nodes associated with each extract-node. Based on the set hop-limit, nodes of the graph 114 that are "k" hops away from each extract-node may be identified as non-extract-nodes associated with the corresponding extract-node. Once each node of the graph 114 is identified as either an extract-node or a non-extract-node, the extraction of the set of first sub-graphs 116A . . . 116N may be initiated. Each extracted first sub-graph may include an extract-node and associated non-extract-nodes that may be 1-hop, 2-hops, . . . , or k-hops away from the extract-node. Details of extraction of the set of first sub-graphs are further provided, for example, in FIG. 3, FIG. 4, and FIG. 5.

The electronic device 102 may be further configured to reduce each first sub-graph of the extracted set of first sub-graphs 116A . . . 116N to obtain a set of reduced sub-graphs that correspond to each first sub-graph of the extracted set of first sub-graphs 116A . . . 116N. In accordance with an embodiment, the electronic device 102 may determine a graph size target, a ring node target, and a set of hyperparameters, for the reduction of each first sub-graph of the extracted set of first sub-graphs 116A . . . 116N. The extracted set of first sub-graphs 116A . . . 116N may be reduced to obtain the set of reduced sub-graphs based on at least one of the determined graph size target, the determined ring node target, and the determined set of hyperparameters. The graph size target may indicate a count of nodes and a count of edges that a reduced subgraph in each set of reduced sub-graphs (corresponding to a first sub-graph) may include after reduction of the first sub-graph. The ring node target may indicate a count of nodes in a ring of nodes at a certain hop-level (from a target node) that may be removed for the reduction of a first sub-graph (associated the target node). The set of hyperparameters may include a weight associated with each ring included in a ring list and whether a ring in the ring list is protected. The ring node target for a ring may be set based on a weight associated with the ring or whether the ring is protected. The ring may be protected if nodes enclosed by the ring cannot be dropped for reduction of an associated first sub-graph. An initial or first ring (i.e., the innermost ring) may be protected since the extract-node (enclosed by the first ring) may be required to be retained. Therefore, the weight of the first ring may be highest as compared to other rings and the ring node target for the first ring may be zero. The weight of a ring may be indicative of an importance of information represented by the nodes that may be enclosed by the ring. The importance of the information may be defined based on a contribution of the information towards the training of the explainable prediction model 110 (by the GXAI engine) for batchwise graph-based machine learning and generation of explainable inference results (i.e., predictions) by the explainable prediction model 110. Details of reduction of the extracted set of first sub-graphs are further provided, for example, in FIG. 3, FIG. 6A, FIG. 6B, FIG. 7A and FIG. 7B.

The electronic device 102 may be further configured to execute a first set of operations to obtain the set of second sub-graphs 120A . . . 120N from the extracted set of first sub-graphs 116A . . . 116N, based on the reduction of each first sub-graph of the extracted set of first sub-graphs 116A . . . 116N. The first set of operations may include an operation to determine a closest reduced sub-graph, from the set of reduced sub-graphs, corresponding to each first sub-graph of the extracted set of first sub-graphs 116A . . . 116N. For example, the electronic device 102 may determine a closest reduced sub-graph from the set of reduced sub-graphs-1 118A. Similarly, a closest reduced sub-graph may be determined from the set of reduced sub-graphs-2 118B, and a closest reduced sub-graph may be determined from the set of reduced sub-graphs-N 118N. Details of determination of the closest reduced sub-graph from each set of reduced sub-graphs corresponding to each first sub-graph are further provided, for example, in FIG. 3 and FIG. 8.

The first set of operations may further include an operation of determining a set of coverage metrics based on the extracted set of first sub-graphs 116A . . . 116N and the determined closest reduced sub-graph corresponding to each first sub-graph of the extracted set of first sub-graphs 116A . . . 116N. In an embodiment, the set of coverage metrics may be determined based on at least one of a first distribution of node repetition, a first distribution of node degree, a second distribution of node repetition, a second distribution of node degree, or a third distribution of node repetition. The set of coverage metrics may include a distribution skew, a first correlation coefficient, and a second correlation coefficient. The first set of operations may further include an operation of determining whether the determined set of coverage metrics satisfy a set of coverage conditions. Details of analysis of coverage based on closest reduced sub-graphs and determination of the set of coverage metrics are further provided, for example, in FIG. 3 and FIG. 9.

The first set of operations may further include an operation of re-iterating the reduction of the extracted set of first sub-graphs 116A . . . 116N based on the determination that the determined set of coverage metrics does not satisfy the set of coverage conditions. The electronic device 102 may be configured to re-iterate the reduction each first sub-graph of the set of first sub-graphs 116A . . . 116N to obtain a set of reduced sub-graphs corresponding to each first sub-graph. Once the set of reduced sub-graphs corresponding to each first sub-graph is obtained, the first set of operations may be repeated.

The electronic device 102 may be further configured to obtain the set of second sub-graphs 120A . . . 120N from the determined closest reduced sub-graph corresponding to each first sub-graph of the extracted set of first sub-graphs 116A . . . 116N of first sub-graphs. The set of second sub-graphs 120A . . . 120N may be obtained based on an iterative control of the execution of the first set of operations until the determined set of coverage metrics satisfy the set of coverage conditions. For example, the second sub-graph 120A may be obtained from the closest reduced sub-graph corresponding to the first sub-graph 116A. The second sub-graph 120A may be determined from the set of reduced sub-graphs-1 118A. Similarly, other second sub-graphs of the set of second sub-graphs 120A . . . 120N may be obtained from the determined closest reduced sub-graph corresponding to other first sub-graphs.

The electronic device 102 may be further configured to train the graph machine learning model 108 (i.e., the GXAI engine) based on the obtained set of second sub-graphs 120A . . . 120N and the received label associated with each node of the set of nodes of the received graph 114. In accordance with an embodiment, the GXAI engine may use the set of second sub-graphs 120A . . . 120N to generate the explainable prediction model 110 for explainable prediction on graph data. The electronic device 102 may be configured to train the explainable prediction model 110 based on the set of second sub-graphs 120A . . . 120N for performance of scalable batchwise machine learning.

Modifications, additions, or omissions may be made to FIG. 1 without departing from the scope of the disclosure. For example, the network environment 100 may include more or fewer elements than those illustrated and described in the present disclosure. In some embodiments, the functionality of each of the server 104 and the database 106 may be incorporated into the electronic device 102, without a deviation from the scope of the disclosure.

Figure 2:
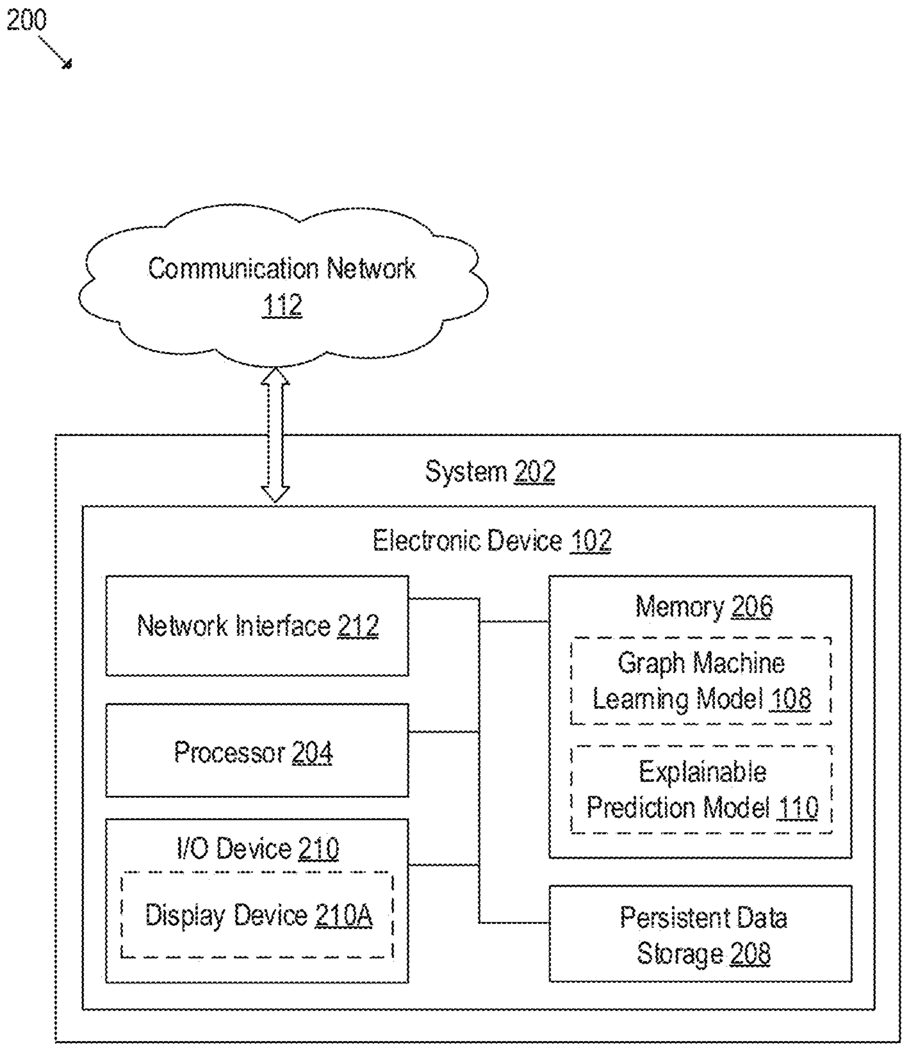
FIG. 2 is a block diagram that illustrates an exemplary electronic device for graph reduction for explainable artificial intelligence (XAI)

FIG. 2 is a block diagram that illustrates an exemplary electronic device for graph reduction for explainable Artificial Intelligence (XAI), in accordance with at least one embodiment described in the present disclosure. FIG. 2 is explained in conjunction with elements from FIG. 1. With reference to FIG. 2, there is shown a block diagram 200 of a system 202 that includes the electronic device 102. The electronic device 102 may include a processor 204, a memory 206, a persistent data storage 208, an input/output (I/O) device 210, and a network interface 212. In at least one embodiment, the memory 206 may store the graph machine learning model 108 and the explainable prediction model 110. In at least one embodiment, the I/O device 210 may include a display device 210A.

The processor 204 may include suitable logic, circuitry, and interfaces that may be configured to execute a set of instructions stored in the memory 206. The processor 204 may be configured to execute program instructions associated with different operations to be executed by the electronic device 102. The processor 204 may be configured to receive the graph 114 representative of a domain, and a label associated with each node of a set of nodes of the received graph 114. The processor 204 may be further configured to extract the set of first sub-graphs 116A . . . 116N from the received graph 114. The processor 204 may be further configured to reduce each first sub-graph (such as, the first sub-graph 116A) of the extracted set of first sub-graphs 116A . . . 116N to obtain the set of reduced sub-graphs (such as, the set of reduced sub-graphs-1 118A) corresponding to each first sub-graph of the extracted set of first sub-graphs 116A . . . 116N. The processor 204 may be further configured to execute the first set of operations to obtain the set of second sub-graphs 120A . . . 120N from the extracted set of first sub-graphs 116A . . . 118N, based on the reduction of each first sub-graph of the extracted set of first sub-graphs 116A . . . 116N. The first set of operations may include determining the closest reduced sub-graph, from the set of reduced sub-graphs (such as, the set of reduced sub-graphs-1 118A), corresponding to each first sub-graph (such as, the first sub-graph 116A) of the extracted set of first sub-graphs 116A . . . 116N. The first set of operation may further include determining the set of coverage metrics based on the extracted set of first sub-graphs 116A . . . 116N and the determined closest reduced sub-graph corresponding to each first sub-graph of the extracted set of first sub-graphs 116A . . . 116N. Further, the first set of operations may include determining whether the determined set of coverage metrics satisfy a set of coverage conditions. Also, the first set of operations may include re-iterating the reduction of the extracted set of first sub-graphs 116A . . . 116N based on the determination that the determined set of coverage metrics does not satisfy the set of coverage conditions. The processor 204 may be further configured to obtain the set of second sub-graphs 120A . . . 120N from the determined closest reduced sub-graph corresponding to each first sub-graph of the extracted set of first sub-graphs 116A . . . 116N, based on an iterative control of the execution of the first set of operations until the determined set of coverage metrics satisfy the set of coverage conditions. The processor 204 may be further configured to train the graph machine learning model 108 based on the obtained set of second sub-graphs 120A . . . 120N and the received label associated with each node of the set of nodes of the received graph 114. The processor 204 may be implemented based on a number of processor technologies known in the art. Examples of the processor technologies may include, but are not limited to, a Central Processing Unit (CPU), X86-based processor, a Reduced Instruction Set Computing (RISC) processor, an Application-Specific Integrated Circuit (ASIC) processor, a Complex Instruction Set Computing (CISC) processor, a Graphical Processing Unit (GPU), a co-processor, or a combination thereof.

Although illustrated as a single processor in FIG. 2, the processor 204 may include any number of processors configured to, individually or collectively, perform or direct performance of any number of operations of the electronic device 102, as described in the present disclosure. Additionally, one or more of the processors may be present on one or more different electronic devices, such as different servers. In at least one embodiment, the processor 204 may be configured to interpret and/or execute program instructions, or process data that may be stored in the memory 206 or the persistent data storage 208. In some embodiments, the processor 204 be configured to may fetch program instructions from the persistent data storage 208 and load the program instructions in the memory 206. After the program instructions are loaded into the memory 206, the processor 204 may execute the program instructions.

The memory 206 may include suitable logic, circuitry, and interfaces that may be configured to store the one or more instructions to be executed by the processor 204. The one or more instructions stored in the memory 206 may be executed by the processor 204 to perform the different operations of the processor 204 (and the electronic device 102). The memory 206 that may store the received graph 114, the extracted set of first sub-graphs 116A . . . 116N, the set of reduced sub-graphs that may correspond to each first sub-graph of the extracted set of first sub-graphs 116A . . . 116N, and the set of second sub-graphs 120A . . . 120N (that comprises the closest reduced sub-graphs determined from the set of reduced sub-graphs corresponding to each first sub-graph). The memory 206 may further store the graph machine learning model 108 and/or the explainable prediction model 110. The memory 206 may be further store a first list (for example, an extract-list) of extract nodes (or extract-IDs) and a second list of non-extract nodes. Examples of implementation of the memory 206 may include, but are not limited to, a CPU cache, a Hard Disk Drive (HDD), a Solid-State Drive (SSD), Random Access Memory (RAM), Read Only Memory (ROM), Electrically Erasable Programmable Read-Only Memory (EEPROM), and/or a Secure Digital (SD) card.

The persistent data storage 208 may include suitable logic, circuitry, and/or interfaces that may be configured to store program instructions executable by the processor 204. The persistent data storage 208 may include computer-readable storage media for carrying or having computer-executable instructions or data structures stored thereon. Such computer-readable storage media may include any available media that may be accessed by a general-purpose or special-purpose computer, such as the processor 204. By way of example, and not limitation, such computer-readable storage media may include tangible or non-transitory computer-readable storage media including Compact Disc Read-Only Memory (CD-ROM) or other optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 204 to perform a certain operation or group of operations associated with the electronic device 102.

The I/O device 210 may include suitable logic, circuitry, and interfaces that may be configured to receive inputs and render outputs based on the received inputs. For example, the I/O device 210 may receive an input that may trigger reception of the graph 114. Further, the I/O device 210 may render outputs such as the set of first sub-graphs 116A . . . 116N, each set of reduced sub-graphs (such as the set of reduced sub-graphs-1 118A), the set of second sub-graphs 120A . . . 120N, or an input sub-graph (associated with a domain), a prediction output of the explainable prediction model 110. The I/O device 210 which may include various input and output devices, may be configured to communicate with the processor 204. Examples of the I/O device 210 may include, but are not limited to, a touch screen, a keyboard, a mouse, a joystick, a display device (e.g., the display device 210A), a microphone, and a speaker The display device 210A may include suitable logic, circuitry, and interfaces that may be configured to render outputs (e.g., prediction results of the explainable prediction model 110) that may be generated by the electronic device 102. The display device 208A may be a touch screen which may enable a user to provide a user-input via the display device 208A. The touch screen may be at least one of a resistive touch screen, a capacitive touch screen, or a thermal touch screen. The display device 208A may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 208A may refer to a display screen of a head mounted device (HMD), a smart-glass device, a see-through display, a projection-based display, an electro-chromic display, or a transparent display.

The network interface 212 may include suitable logic, circuitry, and interfaces that may be configured to facilitate communication between the processor 204 (i.e., the electronic device 102), the server 104, the graph machine learning model 108, and the explainable prediction model 110, via the communication network 112. The network interface 212 may be implemented by use of various known technologies to support wired or wireless communication of the electronic device 102 with the communication network 112. The network interface 212 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 212 may be configured to communicate via wireless communication with networks, such as the Internet, an Intranet, or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), $5^{th}$ Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

Modifications, additions, or omissions may be made to the example electronic device 102 without departing from the scope of the present disclosure. For example, in some embodiments, the example electronic device 102 may include any number of other components that may not be explicitly illustrated or described for the sake of brevity.

Figure 3:
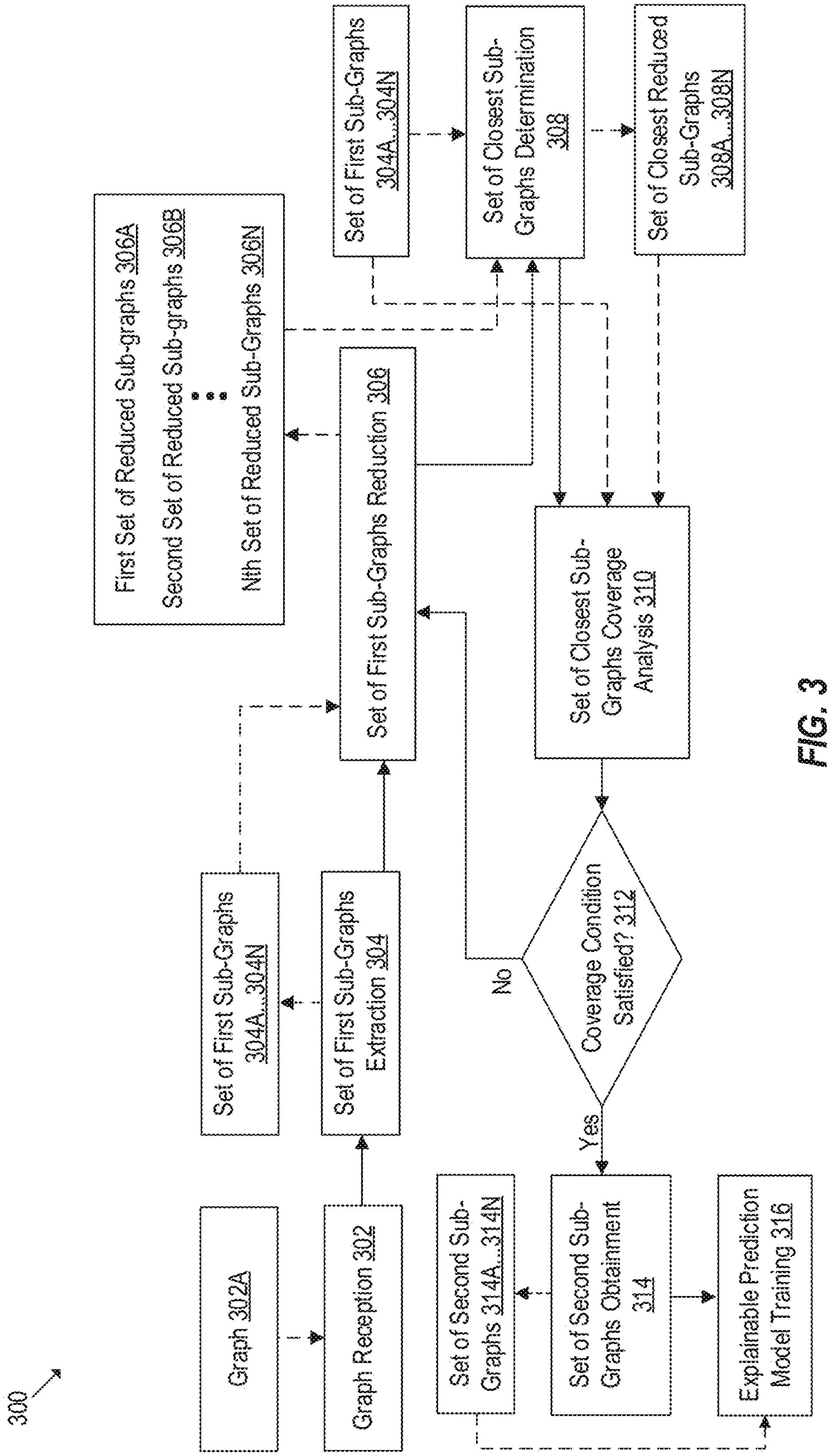
FIG. 3 is a diagram that illustrates an exemplary execution pipeline for graph reduction for explainable artificial intelligence (XAI)

FIG. 3 is a diagram that illustrates an exemplary execution pipeline for graph reduction for explainable Artificial Intelligence (XAI), in accordance with an embodiment of the disclosure. FIG. 3 is described in conjunction with elements from FIG. 1, and FIG. 2. With reference to FIG. 3, there is shown an execution pipeline 300. The exemplary execution pipeline 300 may include a sequence of operations that may be executed by the processor 204 of the electronic device 102 of FIG. 1 for graph reduction for XAI. In the execution pipeline 300, there is shown a sequence of operations that may start from 302 and end at 316.

At 302, a graph 302A may be received. In at least one embodiment, the processor 204 may be configured to receive the graph 302A. The graph 302A may be received as training input graph data that may be representative of a domain, and a label associated with each node of a set of nodes of the graph 302A. For example, the graph 302A may be representative of a credit card fraud detection domain. The graph 302A may include a set of nodes and a set of edges. Each node of the set of nodes may represent an entity such as a credit card, a credit card holder, a point-of-sales (POS), or a business owner. Each edge of the set of edges between two nodes may represent a relationship between two entities represented by the two nodes. The relationship may be either a transaction, a card ownership, or a business ownership.

At 304, a set of first sub-graphs 304A . . . 304N may be extracted. In at least one embodiment, the processor 204 may be configured to extract the set of first sub-graphs 304A . . . 304N. The extracted set of first sub-graphs 304A . . . 304N may be provided to a Graph XAI (GXAI) engine for creation and training of the explainable prediction model 110, and performance of scalable or batch wise graph machine learning. The extraction of the set of first sub-graphs 304A . . . 304N may be necessary as the graph 302A may include a massive number of nodes and edges. An application of graph machine learning using the GXAI engine or the explainable prediction model 110 on the original graph 302A (that may be a massive graph) may be infeasible, due to a vastness of information included in the graph 302A, storage constraints of the GXAI engine, and computational constraints of the GXAI engine. The extraction of the set of first sub-graphs 304A . . . 304N from the graph 302A may split the information included in the graph 302A. Each extracted first sub-graph of the set of first sub-graphs 304A . . . 304N may represent a unit of information that may be manageable for training and inference of the explainable prediction model 110 based on the storage and computational constraints of the GXAI engine. The information associated with each extracted first sub-graph may significantly contribute to generation of explainable inference results by the explainable prediction model 110.

In accordance with an embodiment, the extraction of the set of first sub-graphs 304A . . . 304N from the received graph 304A based on at least one of a hop limit, a node-type associated with the received graph, or a combination of the hop limit and the node type. The processor 204 may identify the node-type associated with each node of the graph 304A as training nodes (also referred as extract-nodes) or test nodes (also referred as non-extract-nodes). Each first sub-graph of the set of first sub-graphs 304A . . . 304N may be extracted around an identified extract-node and may include non-extract-nodes that may be a maximum of k-hops away from the identified extract-node. Herein, "k" may be the hop limit.

The processor 204 may be configured to create a sub-graph list to store the set of first sub-graphs 304A . . . 304N. Each entry of the sub-graph list may include a tuple that may be representative of a first sub-graph of the set of first sub-graphs 304A . . . 304N. A tuple representative of a first sub-graph may include an extract-node around which the first sub-graph is extracted, a ring list, and an edge list. The ring list may include "(k+1)" concentric rings. A first ring or an innermost ring in the ring list may enclose the extract-node. Thereafter, non-extract-nodes 1-hop away from the extract-node may be positioned outside the first ring. The positioned non-extract-nodes may be enclosed by a second ring. Similarly, non-extract-nodes k-hops away from the extract-node may be outside a "$k^{th}$" ring and enclosed by a "$(k+1)^{th}$" ring. However, placement of a non-extract-node outside the "$k^{th}$" ring may be based on determination of the non-extract-node as a neighbor of at least one non-extract-node positioned outside a "$(k-1)^{th}$" ring. The edge list may include a set of edges. Each edge in the edge list may connect a pair of the extract-node (enclosed by the first ring) and a non-extract node (positioned outside the first ring), or a pair of non-extract-nodes (positioned outside subsequent rings or the same ring).

The ring list and the edge list of the tuple may be initially empty. The ring list may be initialized with the extract-node and the first ring. Thereafter, the non-extract-nodes 1-hop away from the extract-node may be positioned outside the first ring, edges connecting the extract-node with each non-extract-nodes (that are 1-hop away) may be included in the edge list. Further a second ring enclosing the non-extract-nodes (that are 1-hop away) may be included in the ring list. The placement of non-extract nodes outside rings included in the ring list, inclusion of edges, and inclusion of rings (enclosing the positioned nodes) in the ring list, may be continued iteratively until non-extract-nodes "k" hops away from the extract-node are positioned outside the "$k^{th}$" ring. Each edge may be included in the edge list and may connect a pair of a non-extract-node enclosed by the "$(k-1)^{th}$" ring and a non-extract-node positioned outside the "$k^{th}$" ring. The "$(k+1)^{th}$" ring may be included in the ring list. At this stage the first sub-graph may be extracted, and the tuple may be included in the sub-graph list.

For example, each first sub-graph of the set of first sub-graphs 304A . . . 304N may be extracted around nodes representative of credit card holders. The processor 204 may identify nodes representative of credit card holders as extract-nodes and may identify nodes representative of credit cards, POS, and business owners as non-extract-nodes. The non-extract-nodes representative of credit cards may be 1-hop away from the extract-nodes. Edges that connect the extract-nodes and the non-extract-nodes representative of credit cards may be representative of card ownership. The non-extract-nodes representative of POS may be 2-hops away from the extract-nodes. Edges that connect the non-extract-nodes representative of credit cards and non-extract-nodes representative of POS may be representative of transactions. In certain cases, nodes that are 2-hops away from a target card holder node may correspond to another card holder node, for the same credit card. For example, in case of joint holder of the same credit card, the second hop nodes from the target card holder node may be a node representative of a joint-holder of the credit card. The non-extract-nodes representative of business owners may be 3-hops away from the extract-nodes. Edges that connect the non-extract-nodes representative of POS and the non-extract-nodes representative of business owners may be representative of business ownership.

For example, a tuple in the sub-graph list representative of an extracted first sub-graph may be extracted around an extract-node representative of a credit card holder. The extracted first sub-graph may include 125 nodes. The ring list may include 4 rings and the edge list may include 124 edges. The extract-node representative of the credit card holder may be enclosed by a first ring. Further, 4 nodes representative of credit cards may be positioned outside the first ring and the enclosed by a second ring. Further, 4 edges may connect the extract-node representative of a credit card holder with the 4 non-extract-nodes representative of credit cards. Thus, the credit card holder may own 4 credit cards. The credit card holder may perform 40 transactions at 40 POS using the 4 credit cards. In an example, 10 transactions may be performed using each credit card at each POS. Thus, 40 nodes representative of POS may be positioned outside the second ring and enclosed by a third ring. Further, 40 edges may connect each of the 4 non-extract-nodes representative of credit cards with each of the 40 non-extract-nodes that may be representative of POS. Further, each POS may be owned by two business owners. Thus 80 non-extract-nodes that may be representative of business owners may be positioned outside the third ring and enclosed by a fourth ring. Further, 80 edges may connect each of the 40 non-extract-nodes that may be representative of POS with the 80 non-extract-nodes representative of business owners. Details related to extraction of the set of first sub-graphs are described further, for example, in FIG. 5.

At 306, each extracted first sub-graph of the extracted set of first sub-graphs 304A . . . 304N may be reduced. In at least one embodiment, the processor 204 may be configured to reduce each extracted first sub-graph of the extracted set of first sub-graphs 304A . . . 304N. Each first sub-graph may be reduced to obtain a corresponding set of reduced sub-graphs. For example, the processor 204 may reduce the first sub-graph 304A for a predefined number of times to obtain a first set of reduced sub-graphs 306A. Similarly, the processor 204 may reduce the first sub-graph 304B for the predefined number of times to obtain a second set of reduced sub-graphs 306B, . . . and reduce the $N^{th}$ sub-graph 304N for the predefined number of times to obtain a $N^{th}$ set of reduced sub-graphs 306N. Further, each set of reduced sub-graphs (306A, 306B, . . . , or 306N) may include the predefined number of reduced sub-graphs.

In accordance with an embodiment, the processor 204 may determine a count of nodes and a count of edges in each first sub-graph. Based on the count of nodes and count of edges in a corresponding first sub-graph (for example, the first sub-graph 304A), the processor 204 may determine a graph size target (i.e., maximum number of nodes that may be retained after the reduction of a first sub-graph 304A). The processor 204 may further determine a ring node target for each ring in a ring list of a tuple representative of each first sub-graph. The ring node target may specify a count of nodes, enclosed by the ring, that may be removed or dropped from an extracted first sub-graph for reduction of the extracted first sub-graph. The ring node target may be determined based on the graph size target and a set of hyperparameters associated with each first sub-graph. The set of hyperparameters may include a weight of each ring in the ring list and an indication of whether a corresponding ring is protected. The ring node target of a protected ring may be zero, and the ring node target of an unprotected ring may be directly proportional to the weight of the ring. A protected ring may be a ring from which none of the constituent nodes may be dropped or removed for the sub-graph reduction. An unprotected ring may be a ring from which one or more constituent nodes may be dropped or removed for the sub-graph reduction. Based on the graph size target and the ring node target of each ring, the processor 204 may be configured to reduce each first sub-graph (for example, the first sub-graph 304A) for the predefined number of times to obtain each set of reduced sub-graphs (for example, the first set of reduced sub-graphs 306A).

The processor 204 may be configured to randomly select non-extract-nodes, enclosed by each unprotected ring (excluding the innermost ring), for removal from the first sub-graph 304A. Each time a randomly selected non-extract-node (enclosed by an unprotected ring), is removed from the first sub-graph 304A, an edge connecting the removed non-extract-node and the extract-node of the first sub-graph 304A, or an edge connecting the removed non-extract-node and any non-extract node of the first sub-graph 304A may be removed. Thereafter, orphan nodes and dangling nodes may be removed from the first sub-graph 304A. The orphan nodes may correspond to non-extract-nodes that are disconnected from other nodes of the first sub-graph 304A after the removal of the randomly selected non-extract-node. The dangling nodes may correspond to non-extract-nodes that are more than k-hops away from the first sub-graph 304A after the removal of the randomly selected non-extract-node.

The processor 204 may further determine whether the graph size target or a ring node target (of the unprotected ring) is satisfied, after the removal of the randomly selected non-extract-node, and any orphan or dangling nodes that may be detected after the removal of the randomly selected non-extract-node. If the graph size target is not satisfied, the processor 204 may determine whether the ring node target is satisfied. If the ring node target is not satisfied, another non-extract-node enclosed by the unprotected ring may be randomly selected for removal from the first sub-graph 304A. After the non-extract node is removed (and after any detected orphan node and dangling node are removed), if it is determined that the ring node target is satisfied, a non-extract-node enclosed by a subsequent unprotected ring may be randomly selected for removal from the first sub-graph 304A. Each time a non-extract-node is removed, the processor 204 may determine whether the first sub-graph 304A satisfies the graph size target. If the graph size target is determined to be satisfied, a reduced sub-graph of the first set of reduced sub-graphs 306A may be obtained. Similarly, other reduced sub-graphs of the first set of reduced sub-graphs 306A may be obtained based on the reduction of the first sub-graph 304A.

The processor 204 may further obtain the predefined number of reduced sub-graphs of the other sets of reduced sub-graphs (such as, the second set of reduced sub-graphs 306B, . . . and the N$^{th}$ set of reduced sub-graphs 306N). The processor 204 may obtain the predefined number of reduced sub-graphs (i.e., the set of reduced sub-graphs) corresponding to each extracted first sub-graph, since a reduced sub-graph is obtained based on removal of randomly selected non-extract-nodes.

For example, the count (i.e., the predefined number) of reduced sub-graphs in a particular set of reduced sub-graphs (corresponding to an extracted first sub-graph) may be 2. The first sub-graph, extracted around the node representative of the credit card holder, may be reduced twice to obtain 2 reduced sub-graphs. The graph size target to obtain a first reduced sub-graph may be set as 16. The first sub-graph may be reduced based on removal of randomly selected non-extract-nodes enclosed by the unprotected rings. The first ring may be protected, while the second ring, the third ring, and the fourth ring, may be unprotected. The ring node target of the second ring, the third ring, and the fourth ring, may be 1, 5, and 1 respectively. Thus, a non-extract-node (amongst, for example, 4 non-extract-nodes) representative of credit card (enclosed by the second ring) may be randomly selected for removal. Similarly, 5 non-extract-nodes (amongst, for example, 10 non-extract-nodes emanating from each non-extract-node representative of credit card) that may be representative of POS (enclosed by the third ring) may be randomly selected for removal. Further, a non-extract-node (amongst, for example, 2 non-extract-nodes emanating from each non-extract-node representative of POS) representative of a business owner (enclosed by the second ring) may be randomly selected for removal. The first reduced sub-graph corresponding to the first sub-graph may include 15 nodes.

The graph size target to obtain a second reduced sub-graph may also be set as 16. The first ring and the fourth ring may be protected, while the second ring and the third ring may be unprotected. The ring node target of the second ring and the third ring may be 2 and 6, respectively. Thus, 2 non-extract-nodes (amongst, for example, 4 non-extract-nodes) representative of credit card (enclosed by the second ring) may be randomly selected for removal. Similarly, 6 non-extract-nodes (amongst, for example, 10 non-extract-nodes that emanate from each non-extract-node representative of credit card) representative of POS (enclosed by the third ring) may be randomly selected for removal. The second reduced sub-graph corresponding to the first sub-graph may include 16 nodes.

At 308, a set of closest reduced sub-graphs 308A . . . 308N may be determined based on each set of reduced sub-graphs corresponding to each extracted first sub-graph of the set of first sub-graphs 304A . . . 304N. In at least one embodiment, the processor 204 may be configured to determine the set of closest reduced sub-graphs 308A . . . 308N based on each set of reduced sub-graphs corresponding to each extracted first sub-graph of the set of first sub-graphs 304A . . . 304N. For example, the processor 204 may determine the closest reduced sub-graph 308A from the first set of reduced sub-graphs 306A. Similarly, the processor 204 may determine the closest reduced sub-graph 308B, . . . and the closest reduced sub-graph 308N, from the second set of reduced sub-graphs 306B, . . . and the N$^{th}$ set of reduced sub-graphs 306B, respectively.

In accordance with an embodiment, the processor 204 may be configured to train a graph kernel encoder based on the extracted set of first sub-graphs 304A . . . 304N. The training may be based on unsupervised learning. Once the training of the graph kernel encoder is completed, the processor 204 may determine a first vector based on an application of the graph kernel encoder on each first sub-graph of the set of first sub-graphs 304A . . . 304N. The graph kernel encoder may encode (or vectorize) each first sub-graph of the set of first sub-graphs 304A . . . 304N for generation of the corresponding first vector. For example, a first vector corresponding to the first sub-graph 304A may be determined based on an encoding of the first sub-graph 304A. Similarly, a first vector corresponding to the first sub-graph 304B may be determined on an encoding of the first sub-graph 304B, . . . and a first vector corresponding to the first sub-graph 304N may be determined on an encoding of the first sub-graph 304N.

The processor 204 may determine a second vector based on an application of the graph kernel encoder on each reduced sub-graph of each set of reduced sub-graphs. For example, a second vector corresponding to each reduced sub-graph of the first set of reduced sub-graphs 306A may be determined. The second vector may be determined based on an encoding of each reduced sub-graph of the first set of reduced sub-graphs 306A. Similarly, a second vector corresponding to each reduced sub-graph of the second set of reduced sub-graphs 306B may be determined, . . . and a second vector corresponding to each reduced sub-graph of the $N^{th}$ set of reduced sub-graphs 306N may be determined.

The processor 204 may be further configured to determine a correlation coefficient between the first vector corresponding the first sub-graph 304A and a second vector corresponding to each reduced sub-graph of the first set of reduced sub-graphs 306A. For example, the first set of reduced sub-graphs 306A may include two reduced sub-graphs. The processor 204 may determine a second vector-1 that corresponds to a first reduced sub-graph of the first set of reduced sub-graphs 306A and a second vector-2 that corresponds to a second reduced sub-graph of the first set of reduced sub-graphs 306A. The processor 204 may determine a correlation coefficient-1 between the first vector corresponding the first sub-graph 304A and the second vector-1 (corresponding to the first reduced sub-graph of the first set of reduced sub-graphs 306A). Similarly, the processor 204 may determine a correlation coefficient-2 between the first vector corresponding the first sub-graph 304A and the second vector-2 (corresponding to the second reduced sub-graph of the first set of reduced sub-graphs 306A).

The processor 204 may be further configured to determine the closest reduced sub-graph from each set of reduced sub-graphs based on a comparison of the correlation coefficients between a first sub-graph and each of the reduced sub-graphs of the corresponding set of reduced sub-graphs. The correlation coefficients may indicate similarities between the first sub-graph and each of the reduced sub-graphs of the corresponding set of reduced sub-graphs. For example, the processor 204 may compare the correlation coefficient-1 and correlation coefficient-2. The comparison between the correlation coefficients may correspond to a comparison between a similarity of the first vector corresponding to the first sub-graph 304A with the second vector corresponding to the first reduced sub-graph of the first set of reduced sub-graphs 306A. Thus, the comparison between the correlation coefficients may be used to determine a similarity of the first vector corresponding to the first sub-graph 304A with the second vector corresponding to the second reduced sub-graph of the first set of reduced sub-graphs 306A.

Based on a result of the comparison, either the first reduced sub-graph or the second reduced sub-graph from the first set of reduced sub-graphs 306A may be determined as the closest reduced sub-graph corresponding to the first sub-graph 304A. If correlation coefficient-1 is determined to be greater than correlation coefficient-2 based on the comparison, the first reduced sub-graph may be determined as the closest reduced sub-graph corresponding to the first sub-graph 304A. On the other hand, if correlation coefficient-2 is determined to be greater than correlation coefficient-1, the second reduced sub-graph may be determined as the closest reduced sub-graph corresponding to the first sub-graph 304A. The determined closest reduced sub-graph corresponding to the first sub-graph 304A may be the closest reduced sub-graph 308A. Similarly, other closest reduced sub-graphs 308B . . . 308N, corresponding to other first sub-graphs of the set of first sub-graphs 304A . . . 304N, may be determined from the other sets of reduced sub-graphs 306B . . . 306N.

At 310, a coverage analysis may be performed for each closest reduced sub-graph of the set of closest reduced sub-graphs 308A . . . 308N. In at least one embodiment, the processor 204 may be configured to perform the coverage analysis of each closest reduced sub-graph of the set of closest reduced sub-graphs 308A . . . 308N. The coverage analysis may include determination of a set of coverage metrics based on the set of first sub-graphs 304A . . . 304N and the set of closest reduced sub-graphs 308A . . . 308N. In an embodiment, the set of coverage metrics may be determined based on at least one of a first distribution of node repetition, a first distribution of node degree, a second distribution of node repetition, a second distribution of node degree, or a third distribution of node repetition. The set of coverage metrics may include a distribution skew, a first correlation coefficient, and a second correlation coefficient. The set of coverage metrics may be determined based on a first list of extract-nodes in the set of closest reduced sub-graphs 308A . . . 308N, a first list of non-extract-nodes in the set of closest reduced sub-graphs 308A . . . 308N, a second list of extract-nodes in the set of first sub-graphs 304A . . . 304N, a second list of non-extract-nodes in the set of first sub-graphs 304A . . . 304N.

The distribution skew may be determined based on a first distribution of node repetition. The first distribution of node repetition may be indicative of a repetition or distribution of information associated with each extract-node of the first list of extract-nodes in multiple closest reduced sub-graphs of the set of closest reduced sub-graphs 308A . . . 308N. A higher distribution skew may indicate an excess representation of information associated with some extract-nodes of the first list of extract-nodes and minuscule representation of information of other extract-nodes of the first list of extract-nodes, in the closest reduced sub-graphs of the set of closest reduced sub-graphs 308A . . . 308N.

The first correlation coefficient may be determined based on a first distribution of node degree of extract-nodes (associated with the first list of extract nodes in the set of closest reduced sub-graphs 308A . . . 308N) and a second distribution of node degree associated with the extract-nodes (of the second list of extract nodes in the set of first sub-graphs 304A . . . 304N). The first distribution of node degree may indicate a variation of node degree of each extract-node of the first list of extract-nodes amongst closest reduced sub-graphs of the set of closest reduced sub-graphs 308A . . . 308N. The second distribution of node degree may indicate a variation of node degree of each extract-node of the second list of extract-nodes amongst first sub-graphs of the set of first sub-graphs 304A . . . 304N. The processor 204 may determine the first correlation coefficient between the first distribution of node degree and the second distribution of node degree. A lower value of the first correlation coefficient may indicate that the first distribution of node degree and the second distribution of node degree are dissimilar and reduction of first sub-graphs of the set of first sub-graphs 304A . . . 304N may be biased in removal of a significant number of specific edges from the extracted first sub-graphs.

The second correlation coefficient may be determined based on a second distribution of node repetition and a third distribution of node repetition. The second distribution of node repetition may be indicative of a repetition or distribution of information associated with non-extract-nodes of the first list of non-extract-nodes in the closest reduced sub-graphs of the set of closest reduced sub-graphs 308A . . . 308N. The third distribution of node repetition may be indicative of a repetition or distribution of information associated with the non-extract-nodes of the second list of non-extract-nodes in the first sub-graphs of the set of first sub-graphs 304A . . . 304N. The processor 204 may determine the second correlation coefficient between the second distribution of node repetition and the third distribution of node repetition. A lower value of the second correlation coefficient may indicate that second distribution of node repetition and the third distribution of node repetition are dissimilar and reduction of first sub-graphs of the set of first sub-graphs 304A . . . 304N may be biased in removal of a significant number of specific nodes.

At 312, a compliance of the set of coverage metrics with a set of coverage conditions may be determined. In at least one embodiment, the processor 204 may be configured to check whether the set of coverage metrics are compliant with the set of coverage conditions. Each coverage condition of the set of coverage conditions may be associated with a coverage threshold. The coverage threshold may be a threshold distribution skew, a threshold first correlation coefficient, or a threshold second correlation coefficient. The set of coverage conditions may include a first coverage condition that may be satisfied if the distribution skew is less than the threshold distribution skew. The set of coverage conditions may include a second coverage condition that may be satisfied if the first correlation coefficient is greater than the threshold first correlation coefficient. Further, the set of coverage conditions may include a third coverage condition that may be satisfied if the second correlation coefficient is greater than the threshold second correlation coefficient. The processor 204 may be configured to re-iterate the reduction of the extracted set of first sub-graphs 304A . . . 304N (operation 306) based on the determination that at least one coverage metric of the set of coverage metrics is not compliant with an associated coverage condition of the set of coverage conditions. The reduction of the extracted set of first sub-graphs 304A . . . 304N may be re-iterated if the distribution skew is determined to be greater than the threshold distribution skew, the first correlation coefficient determined to be less than the threshold first correlation coefficient, and/or a second correlation coefficient determined to be less than the threshold second correlation coefficient.

At 314, a set of second sub-graphs 314A . . . 314N may be obtained from the determined set of closest reduced sub-graphs 308A . . . 308N. In at least one embodiment, the processor 204 may be configured to obtain the set of second sub-graphs 314A . . . 314N from the set of closest reduced sub-graphs 308A . . . 308N corresponding to the set of first sub-graphs 304A . . . 304N. The set of second sub-graphs 314A . . . 314N may be obtained based on a re-iteration of reduction of the extracted set of first sub-graphs 304A . . . 304N (i.e., operations 306, 308, and 310)) until the determined set of coverage metrics is compliant with the set of coverage conditions (which may be determined at step 312). The set of second sub-graphs 314A . . . 314N may correspond to the set of closest reduced sub-graphs 308A . . . 308N that satisfy the set of coverage conditions. For example, in case, the set of closest reduced sub-graphs 308A . . . 308N satisfy the set of coverage conditions, the second sub-graph 314A may correspond to the closest reduced sub-graph 308A. Similarly, the second sub-graph 314N may correspond to the closest reduced sub-graph 308N.

At 316, the explainable prediction model 110 may be trained based on the set of second sub-graphs 314A . . . 314N. In at least one embodiment, the processor 204 may be configured to train the explainable prediction model 110 based on the set of second sub-graphs 314A . . . 314N. The explainable prediction model 110 may be trained using the graph machine learning model 108, such as, the GXAI engine (e.g., a deep tensor). For example, the GXAI engine may receive the set of second sub-graphs 314A . . . 314N as training graph data, and transform information included in each second sub-graph into a uniform tensor representation via tensor decomposition. The GXAI engine may provide the uniform tensor representation to the explainable prediction model 110 for graph machine learning. In accordance with an embodiment, the processor 204 may receive an input sub-graph associated with a domain (for example, credit card fraud detection domain). On reception of the input sub-graph, the processor 204 may apply the trained explainable prediction model 110 on the received input sub-graph. The processor 204 may determine an explainable prediction output based on the application of the trained explainable prediction model 110 on the input sub-graph. The prediction output may indicate relationships (for example, transactions) between entities (for example, credit card and POS). The prediction output may further indicate whether the determined relationship between the entities (for example, a transaction between the credit card and POS) is legitimate.

Embodiments of the disclosure may enable utilization of long-range information for training the explainable prediction model 110, since the hop-limit may be set to a certain value. Setting the hop-limit to higher values may allow selection of non-extract nodes further from a target node (i.e., an extract-node) for extraction of first sub-graphs. The usage of higher values of the hop-limit may boost prediction accuracy of a node-classification machine learning task. Further, as the hop-limit may be set as less than a particular value, the neighborhood explosion issue may also be ameliorated, as graph datasets of varying fanout and complexity may be obtained based on selection of an appropriate hop-limit. Subgraph-based machine learning (based on extracted first sub-graphs) may allow use of topological graph structure information for downstream learning (using the GXAI engine and the explainable prediction model 110), which may improve prediction accuracy. The determination of closest reduced sub-graphs corresponding to extracted first sub-graphs may not be a part of training of the explainable prediction model 110, which may minimize training latency. Further, the prediction output, that may be generated by the explainable prediction model 110, may be explainable.

Embodiments of the disclosure may provide simplified techniques (such as random selection) for removal of non-extract-nodes and edges. The removal of the non-extract-nodes and edges may allow reduction of the size of each extracted first sub-graph of the set of first sub-graphs 304A . . . 304N to a set of reduced sub-graphs. The reduced sub-graphs in the set of reduced sub-graphs corresponding to each extracted first sub-graph may be suitable as a training unit (for training the explainable prediction model 110) based on storage and processing constraints of graph machine learning models. Further, as the closest reduced sub-graph may be a sub-graph (amongst the set of reduced sub-graphs) that may have a highest correlation with respect to the corresponding extracted first sub-graph, such closest reduced sub-graph may retain maximum information of the extracted first sub-graph. The determined closest reduced sub-graphs corresponding to the extracted first sub-graphs may also preserve a topological graph structure of the extracted first sub-graphs. In addition, the reduction of the extracted first sub-graphs may be re-iterated in case the coverage analysis of the closest reduced sub-graphs corresponding to extracted first sub-graphs indicate that information included in the first sub-graphs is not sufficiently retained in the closest reduced sub-graphs. Thus, the closest reduced sub-graphs, obtained after such re-iterations, may satisfy the coverage conditions and thereby retain sufficient information of the extracted first sub-graphs.

Figure 4:
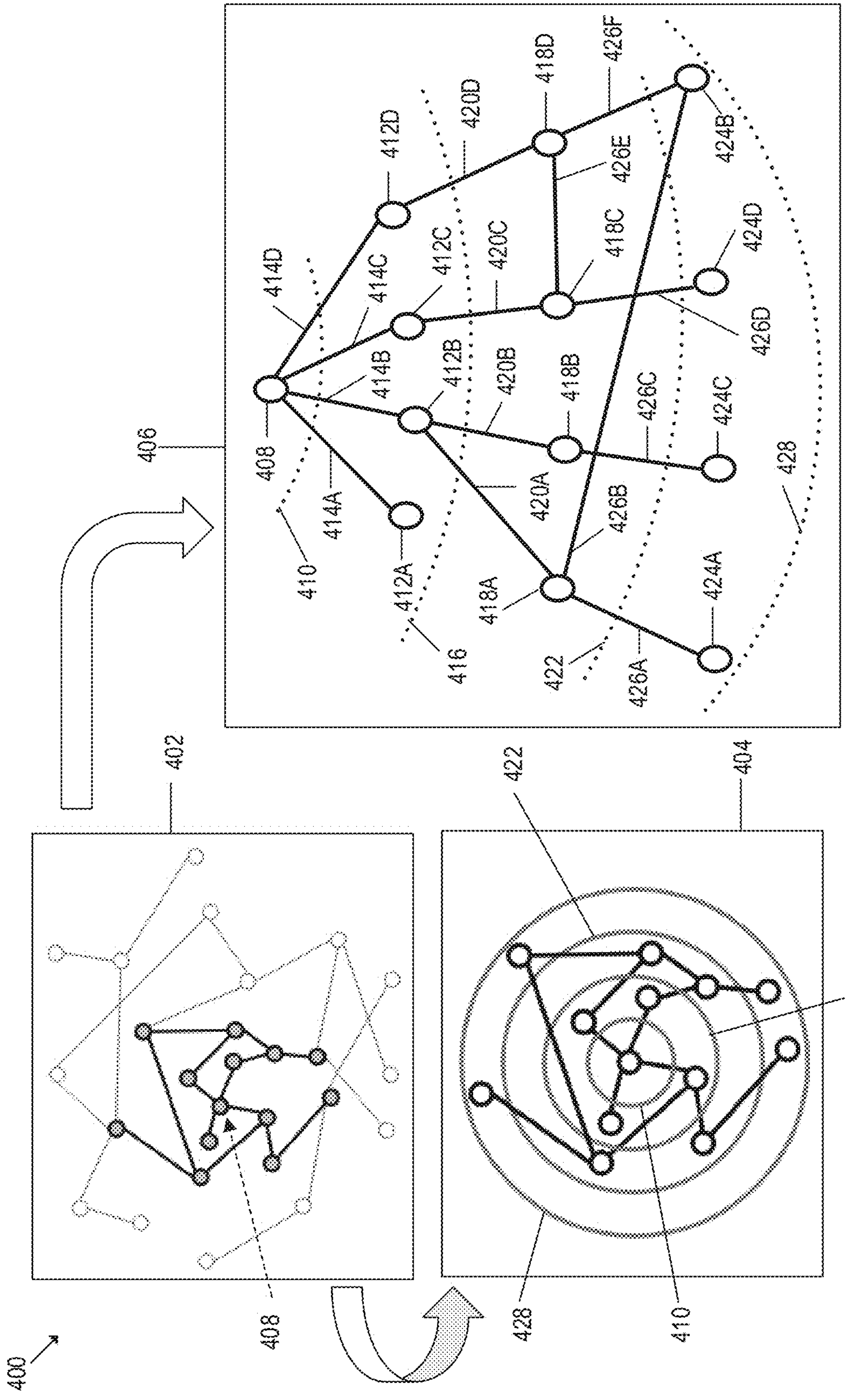
FIG. 4 is a diagram that illustrates an exemplary scenario for extraction of a sub-graph from a received graph.

FIG. 4 is a diagram that illustrates an exemplary scenario for extraction of a sub-graph from a received graph, in accordance with at least one embodiment described in the present disclosure. FIG. 4 is described in conjunction with elements from FIG. 1, FIG. 2, and FIG. 3. With reference to FIG. 4, there is shown an exemplary scenario 400. The exemplary scenario 400 may include a received graph 402. The received graph 402 may be an exemplary implementation of the received graph 114 of FIG. 1. The exemplary scenario 400 may further include a ring-based representation 404 of an extracted first sub-graph and a tree-based representation 406 of the extracted first sub-graph. The extracted first sub-graph may be an exemplary implementation of the extracted first sub-graph 116A of FIG. 1. The processor 204 may be configured to identify an extract-node (for example, the extract-node 408) and a plurality of non-extract-nodes, from the received graph 402, for the extraction of the first sub-graph.

In accordance with an embodiment, the processor 204 may be configured to initialize a tuple representative of the first sub-graph. The tuple may include the extract-node 408, a ring list, and an edge list. The first sub-graph may be extracted around the extract-node 408. The ring list and the edge list tuple may be initially empty. The first sub-graph may be extracted based on inclusion of rings in the ring list, inclusion of non-extract nodes (associated with the extract-node 408) outside each ring (excluding an outermost ring) included in the ring list, and inclusion of edges connecting pairs of the extract-node 408 and non-extract nodes, and pairs of non-extract nodes, in the edge list. The processor 204 may identify nodes of the received graph 402 that may be a maximum of k-hops (e.g., 3-hops) away from the extract-node 408 as non-extract-nodes. For example, the identification may be based on the hop-limit that may be set as 3. The ring list may be initialized with a first ring 410. The first ring 410 may enclose the extract-node 408.

Initially, the processor 204 may be configured to select non-extract-nodes, from the received graph 402, that may be 1-hop away from the extract-node 408. The selected non-extract nodes may be 412A, 412B, 412C, and 412D. The non-extract-nodes may be 412A, 412B, 412C, and 412D, may be determined as neighbors (i.e., neighboring non-extract-nodes) of the extract-node 408 based on edges connecting the extract-node 408 with the non-extract-nodes 412A, 412B, 412C, and 412D, in the received graph 402. The processor 204 may add the non-extract-nodes 412A, 412B, 412C, and 412D, outside the first ring 410. Thereafter, edges connecting the extract-node and each of the added non-extract-nodes may be added to the edge list. The added edges may be 414A (connecting the extract node 408A with the non-extract-node 412A), 414B (connecting the extract node 408A with the non-extract-node 412B), 414C (connecting the extract node 408C with the non-extract-node 412C), and 414D (connecting the extract node 408D with the non-extract-node 412D). Once the edges 414A, 414B, 414C, and 414D, are added to the edge list, the non-extract-nodes 412A, 412B, 412C, and 412D may be enclosed by a second ring 416. The processor 204 may include the second ring 416 in the ring list.

For each non-extract-node added outside the first ring 410, the processor 204 may be configured to identify at least one non-extract-node that may be a neighbor of the corresponding non-extract-node. The identified at least one non-extract-node may be 1-hop away from the corresponding non-extract-node and 2-hops away from the extract-node 408. The identification may be based on edges connecting the at least one non-extract-node and the corresponding non-extract-node. For example, non-extract-nodes 418A and 418B may be identified as neighbors of the non-extract-node 412B (added outside the first ring 410 and enclosed by the second ring 416). Thereafter, the identified at least one non-extract-node may be added outside the second ring 416. For example, the non-extract-nodes 418A and 418B may added outside the second ring 416. Once the identified at least one non-extract-node is added outside the second ring 416, at least one edge connecting the identified at least one non-extract-node and the corresponding non-extract-node may be included in the edge list. For example, an edge 420A connecting the identified non-extract-node 418A and the non-extract-node 412B (added outside the first ring 410), and an edge 420B connecting the identified non-extract-node 418B and the non-extract-node 412B, may be included in the edge list.

Similarly, a non-extract-node 418C may be identified as a neighbor of the non-extract-node 412C and a non-extract-node 418D may be identified as a neighbor of the non-extract-node 412D. Thereafter, the identified non-extract-nodes 418C and 418D may be added outside the second ring 416. An edge 420C connecting the non-extract-node 418C and the non-extract-node 412C, and an edge 420D connecting the non-extract-node 418D and the non-extract-node 412D, may be included in the edge list. Once the edges 420A, 420B, 420C, and 420D, are added to the edge list, the non-extract-nodes 418A, 418B, 418C, and 418D, may be enclosed by a third ring 422. The processor 204 may include the third ring 422 in the ring list.

For each non-extract-node added outside the second ring 416, the processor 204 may be configured to identify at least one non-extract-node that may be a neighbor of the corresponding non-extract-node. The identified at least one non-extract-node may be 1-hop away from the corresponding non-extract-node and 3-hops away from the extract-node 408. For example, non-extract-nodes 424A and 424B may be identified as neighbors of the non-extract-node 418A (which is added outside the second ring 416 and enclosed by the third ring 422). Thereafter, the identified at least one non-extract-node may be added outside the third ring 422. For example, the non-extract-nodes 424A and 424B may added outside the third ring 422. Once the identified at least one non-extract-node is added outside the third ring 422, at least one edge that is connecting the identified at least one non-extract-node and the corresponding non-extract-node (added outside the second ring 416) may be included in the edge list. For example, an edge 426A connecting the identified non-extract-node 424A and the non-extract-node 418A (added outside the second ring 416), and an edge 426B connecting the identified non-extract-node 424B and the non-extract-node 418A, may be included in the edge list.

Similarly, a non-extract-node 424C may be identified as a neighbor of the non-extract-node 418B. The identified non-extract-node 424C may be added outside the third ring 422. An edge 426C connecting the non-extract-node 424C and the non-extract-node 418B may be included in the edge list.

For the non-extract-node 418C (added outside the second ring 416), a non-extract-node 424D and the non-extract-node 418D may be identified as neighbors. The non-extract-node 424D may be added outside the third ring 422, and an edge 426D connecting the non-extract-node 424D and the non-extract-node 418C may be included in the edge list. The non-extract-node 418D (added outside the second ring 416 as a neighbor of the non-extract-node 412D) may not be added outside the third ring 422 since that may lead to duplication of the non-extract-node 418D in the first sub-graph (to be extracted). However, an edge 426E connecting the non-extract-node 418D and the non-extract-node 418C may be included in the edge list.

Similarly, for the non-extract-node 418D (added outside the second ring 416), the non-extract-nodes 418C and 424B may be identified as neighbors. Since the non-extract-node 418C is already added outside the second ring 416 (as a neighbor of the non-extract-node 412C) and the non-extract-node 424B is already added outside the third ring 422 (as a neighbor of the non-extract-node 418A), both the non-extract-nodes 418C and 424B may not be added outside the third ring 422 (to avoid duplications). An edge 426F connecting the non-extract-node 418D and the non-extract-node 424B may be included in the edge list. Since the non-extract-nodes 418C and 418D are connected by the edge 426E, to prevent inclusion of a duplicate edge, no edge may be included in the edge list as a consequence of the identification of the non-extract-node 418C as a neighbor of the non-extract-node 418D.

Once the edges 426A, 426B, 426C, 426D, 426E, and 426F, are added to the edge list, the non-extract-nodes 424A, 424B, 424C, and 424D, may be enclosed by a fourth ring 428. The processor 204 may include the fourth ring 428 in the ring list.

It should be noted that the scenario 400 of FIG. 4 is for exemplary purposes and should not be construed to limit the scope of the disclosure.

Figure 5:
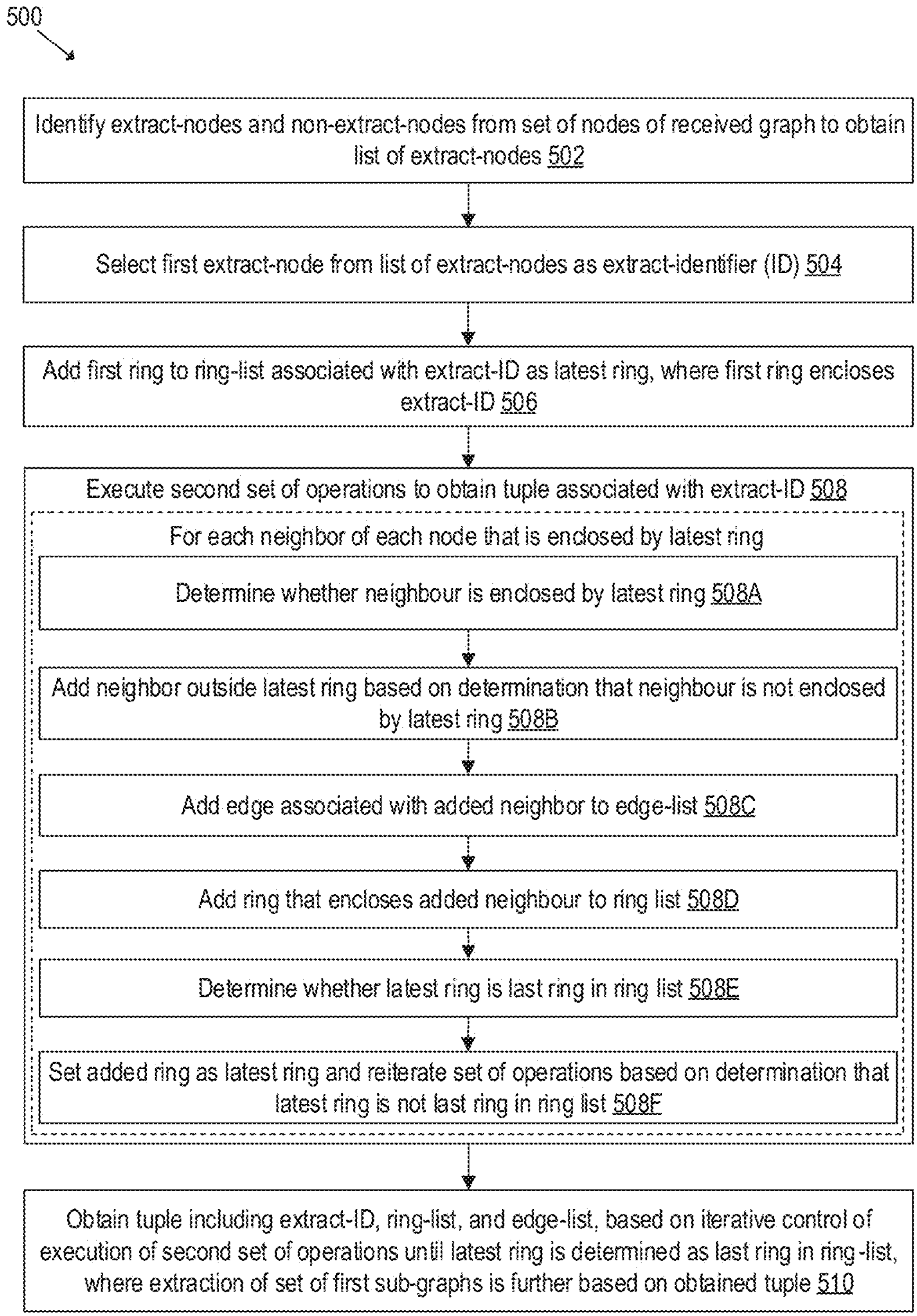
FIG. 5 is a diagram that illustrates a flowchart of an example method for extraction of a sub-graph from a received graph.

FIG. 5 is a diagram that illustrates a flowchart of an example method for extraction of a sub-graph from a received graph, in accordance with an embodiment of the disclosure. FIG. 5 is described in conjunction with elements from FIG. 1, FIG. 2, FIG. 3, and FIG. 4. With reference to FIG. 5, there is shown a flowchart 500. The method illustrated in the flowchart 500 may start at 502 and may be performed by any suitable system, apparatus, or device, such as, by the example electronic device 102 of FIG. 1, or the processor 204 of FIG. 2. Although illustrated with discrete blocks, the steps and operations associated with one or more of the blocks of the flowchart 500 may be divided into additional blocks, combined into fewer blocks, or eliminated, depending on the particular implementation.

At block 502, extract-nodes and non-extract-nodes from the set of nodes of the received graph (for example, the received graph 402) may be identified to obtain a list of extract-nodes. In an embodiment, the processor 204 may be configured to identify extract-nodes and non-extract-nodes from the set of nodes of the received graph 402 to obtain the list of extract-nodes. For example, the node 408 (of the set of nodes) may be identified as an extract-node, and the nodes 412A-412D, 418A-418D, and 424A-424D (of the set of nodes) may be identified as non-extract-nodes. Details of identification of extract-nodes and non-extract-nodes are further provided, for example, in FIG. 1, FIG. 3, and FIG. 4.

At block 504, a first extract-node (for example, the extract-node 408) may be selected from the list of extract-nodes as an extract-identifier (ID). In an embodiment, the processor 204 may be configured to select the first extract-node (i.e., the extract-node 408) from the list of extract-nodes as the extract-ID.

At block 506, a first ring (for example, the first ring 410) may be added as a latest ring to a ring-list associated with the extract-ID (i.e., the extract-node 408). In an embodiment, the processor 204 may be configured to add the first ring to a ring-list associated with the extract-ID (i.e., the extract-node 408). The first ring 410 may enclose the extract-ID (i.e., the extract-node 408). The first ring 410 may be added to initialize the ring list.

At block 508, a second set of operations may be executed to obtain a tuple associated with the extract-ID (i.e., the extract-node 408). In an embodiment, the processor 204 may be configured to execute the second set of operations to obtain a tuple associated with the extract-ID (i.e., the extract-node 408). For each neighbor of each node that is enclosed by the latest ring, the second set of operations may be performed. At this stage, the latest ring may be the first ring 410 and the node enclosed by the first ring 410 may be the extract-node 408. The neighbors of the extract-node 408 may be the non-extract-nodes 412A, 412B, 412C, and 412D. The second set of operations may include, a block 508A, a block 508B, a block 508C, a block 508D, a block 508E, and a block 508F. The second set of operations (508A-508F) may be repeated for each neighbor of each node that is enclosed in the latest ring.

At block 508A, it may be determined whether the neighbor is enclosed by the latest ring. In an embodiment, the processor 204 may determine whether the non-extract-nodes (such as, the nodes 412A, 412B, 412C, and 412D) are enclosed by the first ring 410.

At block 508B, the neighbor outside the latest ring may be added based on the determination that the neighbor is not enclosed by the latest ring. In an embodiment, the processor 204 may add the neighbor outside the latest ring based on the determination that the neighbor is not enclosed by the latest ring. For example, since none of the neighbors, i.e., the non-extract-nodes 412A, 412B, 412C, and 412D, are enclosed by the first ring 410, all the neighbors may be added outside the latest ring, i.e., the first ring 410.

At block 508C, an edge associated with the added neighbor may be added to an edge-list. In an embodiment, the processor 204 may add the edge associated with the added neighbor to the edge-list. For example, the edge associated with the neighbor 412A may be 414A, the edge associated with the neighbor 412B may be 414B, the edge associated with the neighbor 412C may be 414C, and the edge associated with the neighbor 412D may be 414D. Thus, the edges 414A, 414B, 414C, and 414D, may be included in the edge list.

At block 508D, a ring that encloses the added neighbor may be added to the ring-list. In an embodiment, the processor 204 may add the ring that encloses the added neighbor to the ring-list. For example, the second ring 416 may be added to the ring-list. The second ring 416 may enclose the added (i.e., added outside the first ring 410) neighbors 412A, 412B, 412C, and 412D.

At block 508E, it may be determined whether the latest ring is a last ring in the ring list. In an embodiment, the processor 204 may determine whether the latest ring is the last ring in the ring list. For example, the latest ring may be the second ring 416. Herein, the second ring 416 may not be the last ring in the ring list in case the hop limit is 3 and the count of rings in the ring list at this stage is 2. Thus, the count of rings required to be in the ring list for extraction of the first sub-graph may be 4.

At block 508F, the added ring (i.e., the second ring 416) may be selected as the latest ring and the second set of operations (i.e., the operations 508A-508F) may be re-iterated, based on the determination that the latest ring (i.e., the second ring 416) is not the last ring. In an embodiment, the processor 204 may select the added ring as the latest ring and re-iterate the second set of operations (i.e., the operations 508A-508F), based on the determination that the latest ring (i.e., the second ring 416) is not the last ring.

For each neighbor of each node that is enclosed by the second ring 416, the second set of operations may be performed. The non-extract-nodes 412A, 412B, 412C, and 412D, may be enclosed by the second ring 416. There may be no neighbors of the non-extract-node 412A. The neighbors of the non-extract-node 412B may be the non-extract-nodes 418A and 418B. The neighbors of the non-extract-node 412C may be the non-extract-node 418C, and the neighbors of the non-extract-node 412D may be the non-extract-node 418D. The second set of operations may include the operation 508A for the determination of whether the neighbor is enclosed by the latest ring. For example, the processor 204 may determine whether the non-extract-nodes 418A, 418B, 418C, and 418D, are enclosed by the second ring 416. The second set of operations may further include the operation 508B for the addition of the neighbor outside the latest ring, based on the determination that the neighbor is not enclosed by the latest ring. Since none of the neighbors, i.e., the non-extract-nodes 418A, 418B, 418C, and 418D, are enclosed by the second ring 416, all the neighbors may be added outside the latest ring, i.e., the second ring 416. The second set of operations may further include the operation 508C for the addition of an edge associated with the added neighbor to an edge-list. The edge associated with the neighbor 418A may be the edge 420A, the edge associated with the neighbor 418B may be 420B, the edge associated with the neighbor 418C may be 420C, and the edge associated with the neighbor 418D may be 420D. Thus, the edges 420A, 420B, 420C, and 420D may be included in the edge list. The second set of operations may further include the operation 508D for the addition of a ring to the ring-list that encloses the added neighbor. For example, the third ring 422 may be added to the ring-list. The third ring 422 may enclose the added (i.e., added outside the second ring 416) neighbors 418A, 418B, 418C, and 418D. The second set of operations may further include the operation 508E for the determination of whether the latest ring is a last ring in the ring list. In an example, the latest ring may be the third ring 422. The third ring 422 may not the last ring in the ring list since the count of rings in the ring list at this stage may be 3 and the count of rings required to be in the ring list for extraction of the first sub-graph may be 4. The second set of operations may further include the operation 508F for the selection of the added ring (i.e., the third ring 422) as the latest ring and the re-iteration of the second set of operations, based on the determination that the latest ring (i.e., the third ring 422) is not the last ring in the ring-list, and so on.

At block 510, the tuple (associated with the extract-node 408), including the extract-ID (i.e., the extract-node 408), the ring-list, and the edge-list, may be obtained based on an iterative control of the execution of the second set of operations until the latest ring is determined as the last ring in the ring-list. In an embodiment, the processor 204 may be configured to obtain the tuple that may include the extract-ID (i.e., the extract-node 408), the ring-list, and the edge-list. The tuple may be obtained based on the iterative control of the execution of the set of operations until the latest ring is determined as the last ring in the ring-list. Thus, the tuple associated with the extract-node 408 may be obtained based on the determination of the latest ring (i.e., the fourth ring 428) as the last ring in the ring-list. The ring list may include the first ring 410, the second ring 416, the third ring 422, and the fourth ring 428. The edge list may include the edges 414A-414D, 420A-420D, and 426A-426F. The extraction of the set of first sub-graphs 116A . . . 116N may be further based on the obtained tuple. For example, the obtained tuple including the extract-ID (e.g., the extract-node 408), the ring-list, and the edge-list may be representative of the extracted first sub-graph (e.g., the first sub-graph 116A). Control may pass to end.

Although the flowchart 500 is illustrated as discrete operations, such as 502, 504, 506, 508 (including 508A-508F), and 510, the disclosure is not so limited. However, in certain embodiments, such discrete operations may be further divided into additional operations, combined into fewer operations, or eliminated, depending on the particular implementation without detracting from the essence of the disclosed embodiments.

Figure 6A:
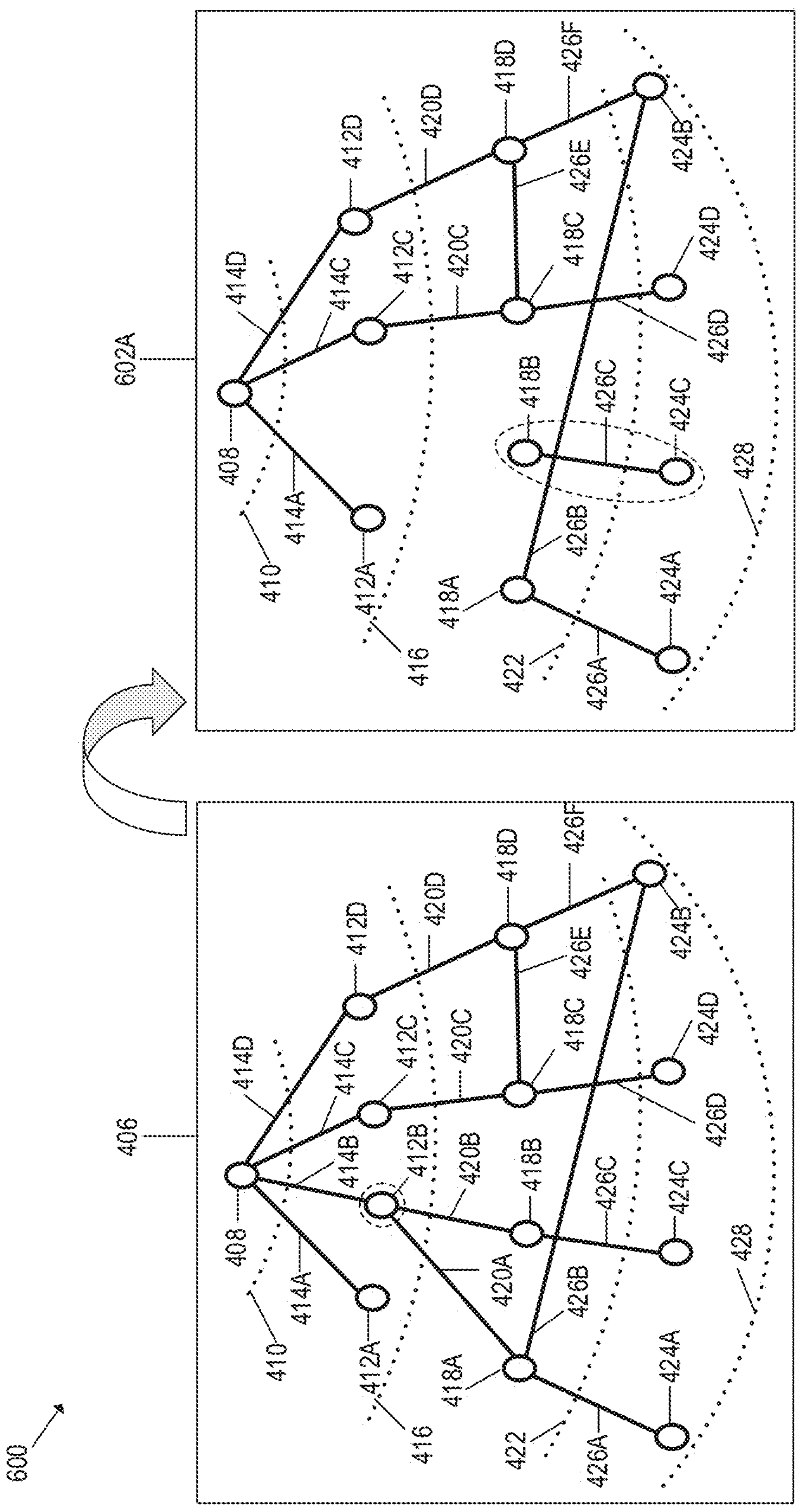
FIGS. 6A and 6B are diagrams that collectively illustrate an exemplary scenario for reduction of an extracted sub-graph.
Figure 6B:
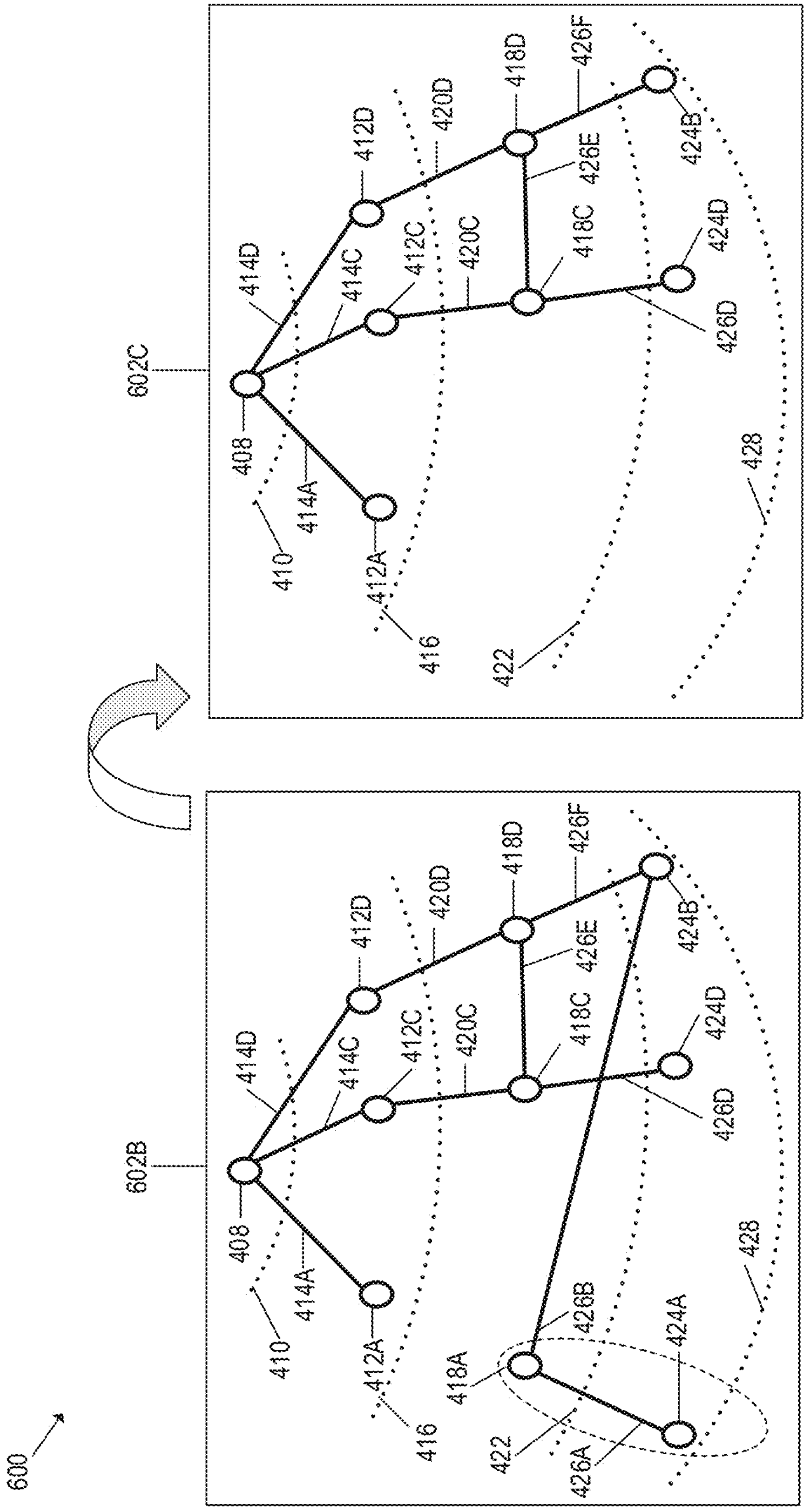

FIGS. 6A and 6B are diagrams that collectively illustrate an exemplary scenario for reduction of an extracted sub-graph, in accordance with at least one embodiment described in the present disclosure. FIGS. 6A and 6B are described in conjunction with elements from FIG. 1, FIG. 2, FIG. 3, FIG. 4, and FIG. 5. With reference to FIGS. 6A and 6B, there is shown an exemplary scenario 600. The exemplary scenario 600 may include the tree-based representation 406 of the extracted first sub-graph (i.e., the exemplary implementation of the extracted first sub-graph 116A) and a first interim reduced sub-graph 602A (obtained based on reduction of the extracted first sub-graph). Further, the exemplary scenario 600 may include a second interim reduced sub-graph 602B (obtained based on reduction of the first interim reduced sub-graph 602A) and the obtained final reduced sub-graph 602C (obtained based on reduction of the second interim reduced sub-graph 602B).

In accordance with an embodiment, the processor 204 may be configured to determine a ring node target for each ring of the extracted first sub-graph and a graph size target for reduction of the first sub-graph. Based on the ring node target and the graph size target, the processor 204 may reduce the extracted first sub-graph. For each ring, in a ring list of a tuple representative of the extracted first sub-graph, processor 204 may further determine whether a corresponding ring is protected. The processor 204 may select an unprotected ring, from the ring list, for removal of nodes and edges associated with the nodes enclosed by the selected unprotected ring. For example, the second ring 416 of the first sub-graph may be selected based on the determination that the second ring 416 is unprotected. Thereafter, the processor 204 may randomly select a non-extract node enclosed by the second ring 416. For example, the non-extract node 412B may be selected. Thereafter, the non-extract node 412B and edges associated with the non-extract node 412B may be removed (i.e., dropped or rejected) from the first sub-graph. The removed edges may include the edges 414B, 420A, and 420B. The removal of the non-extract node 412B and the associated edges 414B, 420A, and 420B, may result in the first interim reduced sub-graph 602A.

The processor 204 may be further configured to determine whether the first interim reduced sub-graph 602A includes any disconnected non-extract-nodes. For example, based on the removal of the non-extract node 412B and the edges 414B, 420A, and 420B, the processor 204 may detect one or more disconnected non-extract-nodes in the extracted sub-graph (i.e., the first interim reduced sub-graph 602A). For example, non-extract-nodes 418B and 424C may be detected as the disconnected non-extract-nodes (or orphan nodes). Thereafter, the disconnected non-extract-nodes 418B and 424C, and an associated edge 426C may be removed (i.e., dropped or rejected) from the first sub-graph. The removal of the non-extract nodes 418B and 424C and the associated edge 426C, may result in the second interim reduced sub-graph 602B (as shown in FIG. 6B).

The processor 204 may be further configured to determine whether the second interim reduced sub-graph 602B includes any non-extract-nodes that are more than "k-hops" away from the extract-node 408, where "k" may be the hop-limit (e.g., k=3). The removal of the non-extract node 412B and the edges 414B, 420A, and 420B, may also result in detection of non-extract nodes that are further from the extract-node beyond a hop-limit. For example, non-extract-nodes 418A and 424A may be detected to be the beyond the hop-limit in the second interim reduced sub-graph 602B. The non-extract-nodes 418A and 424A may be referred as dangling nodes. Thereafter, the dangling non-extract-nodes 418A and 424A, and an associated edge 426B may be removed (i.e., dropped or rejected) from the first sub-graph. The removal of the non-extract nodes 418A and 424A and the edge 426B, may result in obtaining of the final reduced sub-graph 602C (as shown in FIG. 6B).

It should be noted that the scenario 600 of FIGS. 6A and 6B are for exemplary purposes and should not be construed to limit the scope of the disclosure.

Figure 7A:
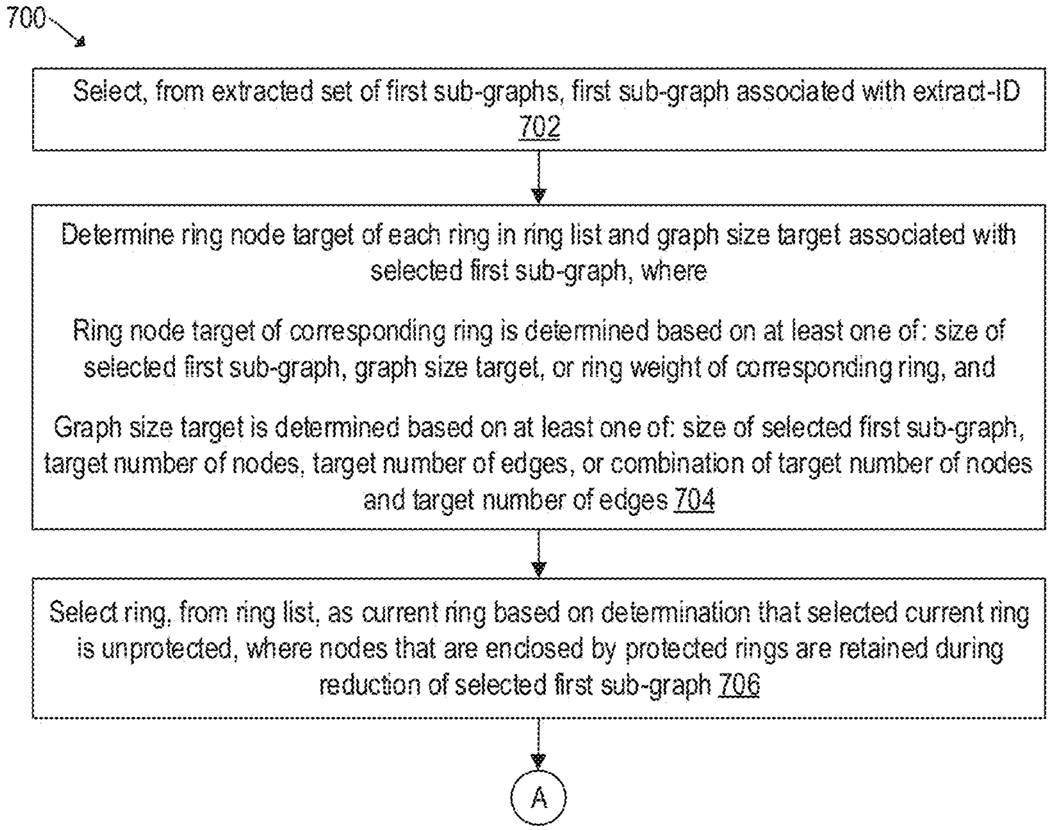
FIGS. 7A and 7B are diagrams that collectively illustrate a flowchart of an example method for reduction of an extracted sub-graph.
Figure 7B:
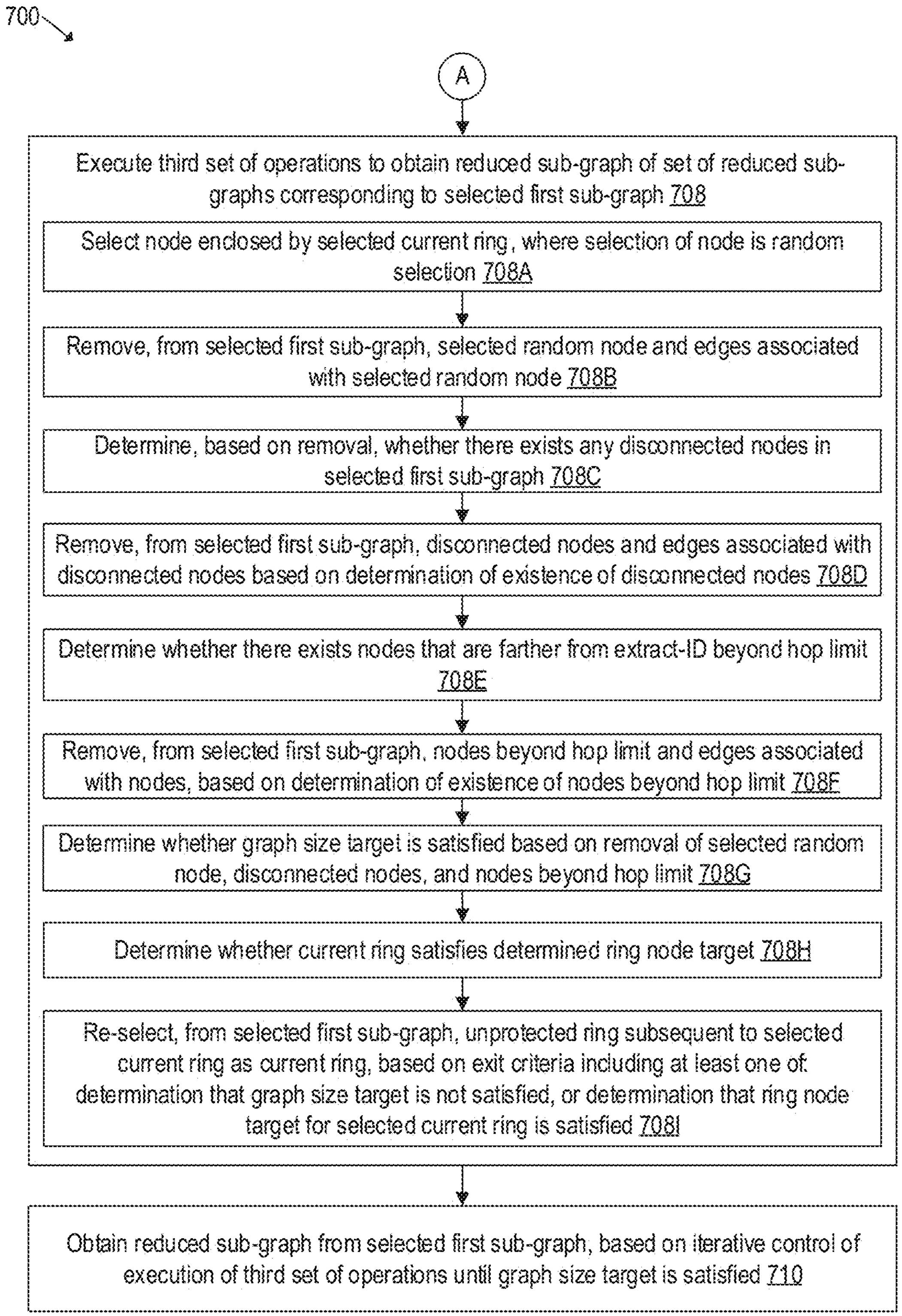

FIGS. 7A and 7B are diagrams that collectively illustrate a flowchart of an example method for reduction of an extracted subgraph, in accordance with an embodiment of the disclosure. FIGS. 7A and 7B are described in conjunction with elements from FIG. 1, FIG. 2, FIG. 3, FIG. 4, FIG. 5, FIG. 6A, and FIG. 6B. With reference to FIGS. 7A and 7B, there is shown a flowchart 700. The method illustrated in the flowchart 700 may start at 702 and may be performed by any suitable system, apparatus, or device, such as, by the example electronic device 102 of FIG. 1, or the processor 204 of FIG. 2. Although illustrated with discrete blocks, the steps and operations associated with one or more of the blocks of the flowchart 700 may be divided into additional blocks, combined into fewer blocks, or eliminated, depending on the particular implementation.

At block 702, a first sub-graph associated with an extract-ID may be selected from the extracted set of first sub-graphs 116A . . . 116N. In an embodiment, the processor 204 may be configured to select, from the extracted set of first sub-graphs 116A . . . 116N, a first sub-graph associated with an extract-ID. For example, the selected first sub-graph may be the first sub-graph 116A. The extract-ID may correspond to the extract-node 408, illustrated in the tree-based representation 406 of the extracted first sub-graph 116A.

At block 704, a ring node target for each ring in a ring list and a graph size target associated with the selected first sub-graph (for example, the first sub-graph 116A) may be determined. In an embodiment, the processor 204 may be configured to determine the ring node target for each ring in the ring list and the graph size target associated with the selected first sub-graph. The ring node target of a corresponding ring may be determined based on at least one of a size of the selected first sub-graph, the graph size target, or a ring weight of the corresponding ring. The graph size target may be determined based on at least one of the size of the selected first sub-graph, a target number of nodes, a target number of edges, or a combination of the target number of nodes and the target number of edges.

For example, the graph size target (i.e., a count of nodes that may be included in a reduced sub-graph) associated with the first sub-graph 116A may be determined as "8" based on size of the first sub-graph 116A ("13" nodes and "14" edges), a target number of nodes (for example, "7" nodes), a target number of edges (for example, "8" edges), or a combination of the target number of nodes or the target number of edges.

For example, the ring list, included a tuple representative of the first sub-graph 116A, may include 4 rings, viz., the first ring 410, the second ring 416, the third ring 422, and the fourth ring 428 (in case, hop limit is set as 3). The processor 204 may be configured to determine a ring node target for each of the four rings based on the determined graph size target (i.e., "8"), the determined size of the first sub-graph 116A (i.e., "13" nodes and "14" edges) and a weight of the corresponding ring. The ring node target for each of the four rings may be further determined based on whether each of the four rings are protected.

At block 706, a ring, from the ring list, may be selected as a current ring based on a determination that the selected current ring is unprotected. In an embodiment, the processor 204 may be configured to select the ring, from the ring list, as the current ring based on the determination that the selected current ring is unprotected. Herein, nodes that are enclosed by protected rings or edges may be retained during reduction of the selected first sub-graph. For example, the processor 204 may select the second ring 416 as the current ring. The first ring 410 may be a protected ring, while the second ring 416, the third ring 422, and the fourth ring 428, may be unprotected. Since the first ring 410 is protected, the first ring 410 may not be selected for reduction. The selection of the second ring 416 may be based on a determination that the second ring 416 is unprotected. The ring node target (i.e., count of nodes enclosed by a ring that may be removed for reduction of first sub-graph) for the second ring 416 may be determined as "1". Thus, any one non-extract nodes enclosed by the second ring 416 may be randomly selected for removal to obtain a reduced sub-graph corresponding to the first sub-graph 116A.

At block 708, a third set of operations may be executed to obtain a reduced sub-graph of the set of reduced sub-graphs corresponding to the selected first sub-graph. In an embodiment, the processor 204 may be configured to execute the third set of operations to obtain the reduced sub-graph of the set of reduced sub-graphs corresponding to the selected first sub-graph. For example, the final reduced sub-graph 602C corresponding to the first sub-graph 116A may be obtained based on execution of the third set of operations. The third set of operations may include, a block 708A, a block 708B, a block 708C, a block 708D, a block 708E, a block 708F, a block 708G, a block 708H, and a block 708I.

At block 708A, a node enclosed by the selected current ring may be selected. The selection of the node may be a random selection. In an embodiment, the processor 204 may select a node enclosed by the selected current ring, wherein the selection of the node may be a random selection. For example, the non-extract-node 412B enclosed by the second ring 416 may be randomly selected.

At block 708B, from the selected first sub-graph, the selected random node and edges associated with the selected random node may be removed. In an embodiment, the processor 204 may remove, from the selected first sub-graph, the selected random node and edges associated with the selected random node. For example, the processor 204 may remove the selected non-extract-node 412B and edges associated with the non-extract-node 412B, viz., the edges 414B, 420A, and 420B, from the first sub-graph 116A (to obtain the first interim reduced sub-graph 602A).

At block 708C, based on the removal, it may be determined whether there exist any disconnected nodes in the selected first sub-graph. In an embodiment, the processor 204 may determine, based on the removal, whether there exist any disconnected nodes in the selected first sub-graph. For example, the processor 204 may determine whether there are any disconnected nodes in the first interim reduced sub-graph 602A.

At block 708D, from the selected first sub-graph (i.e., the first interim reduced sub-graph 602A), the disconnected nodes and edges associated with the disconnected nodes may be removed, based on the determination of the existence of the disconnected nodes. In an embodiment, the processor 204 may remove, from the selected first sub-graph, the disconnected nodes and edges associated with the disconnected nodes, Based on the determination of the existence of the disconnected nodes. For example, based on a determination of disconnected nodes (i.e., the non-extract-nodes 418B and 424C), the processor 204 may remove the non-extract-nodes 418B and 424C, and the edge 426C (associated with the non-extract-nodes 418B and 424C) from the first interim reduced sub-graph 602A. Based on the removal of the non-extract-nodes 418B and 424C, and the edge 426C, the second interim reduced sub-graph 602B may be obtained.

At block 708E, it may be determined whether there exist nodes that are farther from the extract-ID (i.e., the extract-node 408) beyond a hop limit. In an embodiment, the processor 204 may determine whether there exist any nodes that are farther from the extract-ID beyond the hop limit. For example, the processor 204 may determine whether any nodes beyond the hop limit (i.e., more than 3-hops away from the extract-node 408) exist in the second interim reduced sub-graph 602B.

At block 708F, from the selected first sub-graph (i.e., the second interim reduced sub-graph 602B), the nodes that are beyond the hop limit and edges associated with those nodes may be removed, based on the determination of the existence of the nodes beyond the hop limit. In an embodiment, the processor 204 may remove, from the selected first sub-graph, the nodes that are beyond the hop limit and the edges associated with such nodes, based on the determination of the existence of the nodes beyond the hop limit. For example, based on a determination of nodes beyond the hop limit, i.e., the non-extract-nodes 418A (4-hops or 5-hops) and 424A (5-hops or 6-hops), the processor 204 may remove the non-extract-nodes 418A and 424A, and the edge 426A (associated with the non-extract-nodes 418A and 424A) from the second interim reduced sub-graph 602B. Based on the removal of the non-extract-nodes 418A and 424A, and the edge 426A, the final reduced sub-graph 602C may be obtained.

At block 708G, it may be determined whether the graph size target is satisfied based on the removal of the selected random node, the disconnected nodes, and the nodes beyond the hop limit. In an embodiment, the processor 204 may determine whether the graph size target is satisfied based on the removal of the selected random node, the disconnected nodes, and the nodes beyond the hop limit. For example, based on the determined graph size target (i.e., "8") and count of nodes (which is also 8 nodes) in the final reduced sub-graph 602C, the processor 204 may determine that the graph size target is satisfied. The removal of non-extract-nodes 412B, 418A, 418B, 424A, and 424C, and associated edges 414B, 420A, 420B, 426A, and 426C, may reduce the reduce the count of nodes (in the first sub-graph 116A) from "13" to "8" (in the final reduced sub-graph 602C). The graph size target may be satisfied if the count of nodes in the final reduced sub-graph 602C is equal to or less than "8". In the current case, as the count of nodes in the final reduced sub-graph 602C is "8", the graph size target is satisfied.

At block 708H, it may be determined whether the current ring (i.e., the second ring 416) satisfies the determined ring node target (i.e., "1"). In an embodiment, the processor 204 may determine whether the current ring satisfies the determined ring node target. For example, based on the removal of one node (i.e., the non-extract-node 412B) enclosed by the second ring 416 from the first sub-graph 116A, the processor 204 may determine that the ring node target of the second ring 416 is satisfied.

At block 708I, from the selected first sub-graph (i.e., the first sub-graph 116A), an unprotected ring subsequent to the selected current ring may be selected as the current ring, based on an exit criteria. In an embodiment, the processor 204 may select, from the selected first sub-graph, an unprotected ring that is subsequent to the selected current ring, as the current ring, based on the exit criteria. The exit criteria may include the determination that the graph size target is not satisfied, and the determination that the ring node target of the selected current ring (i.e., the second ring 416) is satisfied. Based on the determinations included in the exit criteria, the processor 204 may be configured to select the third ring 422 (i.e., an unprotected ring subsequent to the second ring 416, which is the selected current ring) as the current ring if the graph size target is not satisfied and the ring node target of the second ring 416 is satisfied. In current example, as the graph size target is satisfied, the third ring 422 may not be re-selected as the current ring.

At block 710, the reduced sub-graph may be obtained from the selected first sub-graph based on an iterative control of the execution of the third set of operations until the graph size target is satisfied. In an embodiment, the processor 204 may be configured to obtain the reduced sub-graph from the selected first sub-graph, based on an iterative control of the execution of the set of operations until the selected first sub-graph satisfies the graph size target. For the exemplary first sub-graph 116A, the iterative control of the execution of the third set of operations may not be required since the final reduced sub-graph 602C is obtained based on the removal of the non-extract-node 412B from the first sub-graph 116A. However, if the graph size target is determined as "7" or less, the processor 204 may be configured to select the third ring 422 as the current ring. Thereafter, the third set of operations may be re-iterated such that a non-extract-node enclosed by the third ring 422 may be randomly selected and removed. Further, if the ring node target is more than "1", the ring node target of the selected current ring (i.e., the second ring 416) may not be satisfied. In such a scenario, the processor 204 may be configured to continue the selection of the second ring 416 as the current ring and re-iterate the third set of operations such that another non-extract-node enclosed by the second ring 416 may be randomly selected and removed. The processor 204 may be configured to determine, at each instance of removal of a non-extract-node enclosed by an unprotected ring, whether the graph size target is satisfied. A reduced sub-graph corresponding to the selected first sub-graph may be obtained when the graph size target is satisfied.

In accordance with an embodiment, the selected first sub-graph may be reduced a predefined number of times to obtain a set of reduced sub-graphs that corresponds to the selected first sub-graph (such as the set of reduced sub-graphs-1 118A). The repetition reduction of the selected first sub-graph for the predefined number of times may ensure that the set of reduced sub-graphs includes at least one reduced sub-graph (corresponding to the selected extracted first sub-graph), which may be highly correlated with the selected first sub-graph. Similarly, other extracted first sub-graphs of the set of extracted first sub-graphs may be selected, and each extracted first sub-graph may be reduced to obtain a set of reduced sub-graphs. Control may pass to end.

Although the flowchart 700 is illustrated as discrete operations, such as 702, 704, 706, 708 (708A-708I), and 710, the disclosure is not so limited. However, in certain embodiments, such discrete operations may be further divided into additional operations, combined into fewer operations, or eliminated, depending on the particular implementation without detracting from the essence of the disclosed embodiments.

Figure 8:
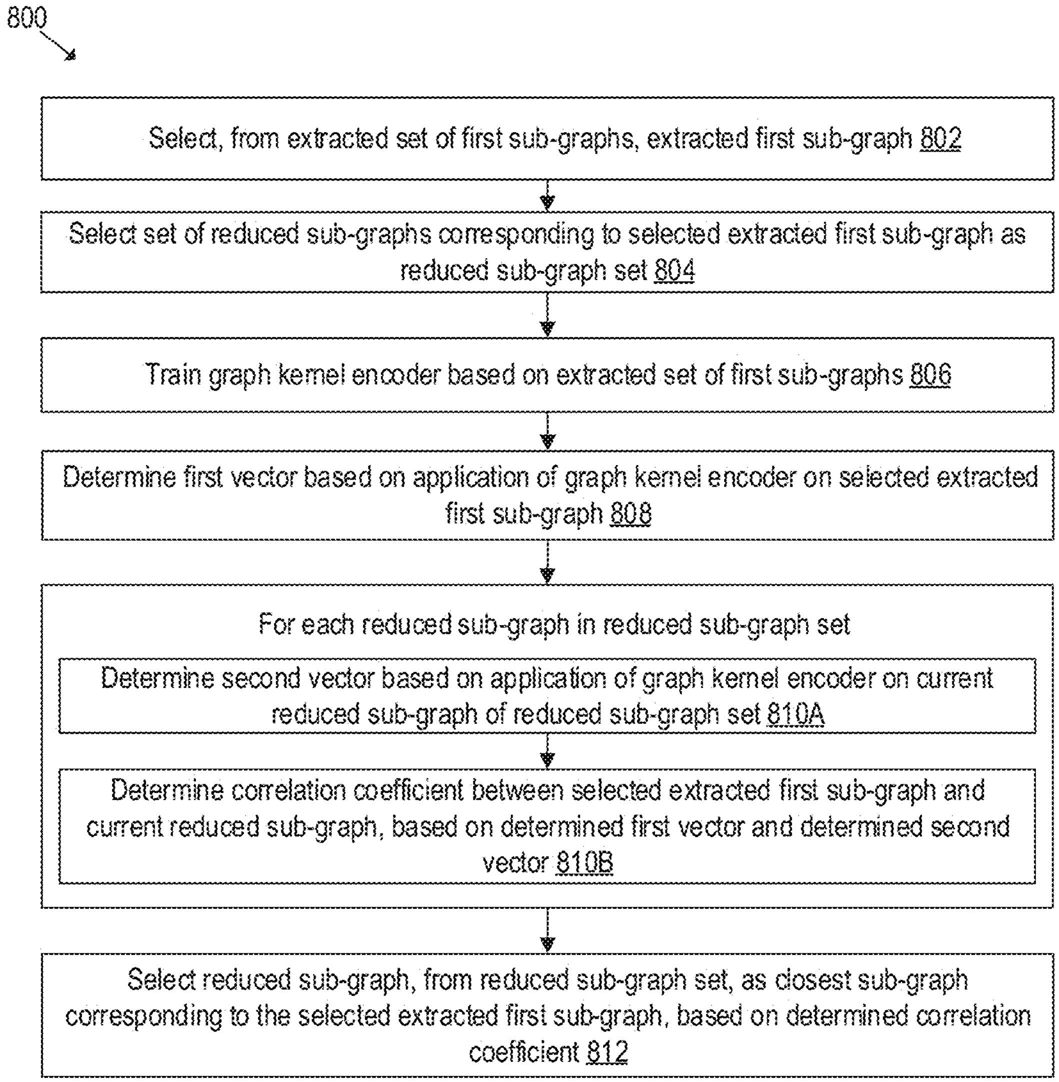
FIG. 8 is a diagram that illustrates a flowchart of an example method for a determination of a closest reduced sub-graph corresponding to an extracted sub-graph.

FIG. 8 is a diagram that illustrates a flowchart of an example method for a determination of a closest reduced sub-graph corresponding to an extracted sub-graph, in accordance with an embodiment of the disclosure. FIG. 8 is described in conjunction with elements from FIG. 1, FIG. 2, FIG. 3, FIG. 4, FIG. 5, FIG. 6A, FIG. 6B, FIG. 7A, and FIG. 7B. With reference to FIG. 8, there is shown a flowchart 800. The method illustrated in the flowchart 800 may start at 802 and may be performed by any suitable system, apparatus, or device, such as, by the example electronic device 102 of FIG. 1, or the processor 204 of FIG. 2. Although illustrated with discrete blocks, the steps and operations associated with one or more of the blocks of the flowchart 800 may be divided into additional blocks, combined into fewer blocks, or eliminated, depending on the particular implementation.

At block 802, an extracted first sub-graph may be selected from the extracted set of first sub-graphs 304A . . . 304N. In an embodiment, the processor 204 may be configured to select, from the extracted set of first sub-graphs 304A . . . 304N, an extracted first sub-graph. For example, the selected extracted first sub-graph may be the first sub-graph 304A.

At block 804, the set of reduced sub-graphs corresponding to the selected extracted first sub-graph may be selected as a reduced sub-graph set. In an embodiment, the processor 204 may be configured to select the set of reduced sub-graphs corresponding to the selected extracted first sub-graph as a reduced sub-graph set. For example, the first set of reduced sub-graphs 306A corresponding to selected extracted first sub-graph 304A may be selected as the reduced sub-graph set.

At block 806, a graph kernel encoder may be trained based on the extracted set of first sub-graphs. In an embodiment, the processor 204 may be configured to train the graph kernel encoder based on the extracted set of first sub-graphs. For example, the graph kernel encoder may be trained based on the extracted set of first sub-graphs 304A . . . 304N. In an embodiment, the training may be based on unsupervised (machine learning (ML)-based) training. Based on the training, an input extracted first sub-graph and/or an input reduced sub-graph (obtained based on the reduction of the input extracted first sub-graph) may be vectorized.

At block 808, a first vector may be determined based on an application of the graph kernel encoder on the selected extracted first sub-graph. In an embodiment, the processor 204 may be configured to determining the first vector based on an application of the graph kernel encoder on the selected extracted first sub-graph. For example, a first vector may be determined based on the application of the graph kernel encoder on the selected extracted first sub-graph 304A.

At block 810A, a second vector may be determined based on an application of the graph kernel encoder on a current reduced sub-graph of the reduced sub-graph set. In an embodiment, the processor 204 may be configured to determine a second vector based on the application of the graph kernel encoder on the current reduced sub-graph of the reduced sub-graph set. From the reduced sub-graph set (i.e., the first set of reduced sub-graphs 306A), a current reduced sub-graph may be selected. For example, the reduced sub-graph set may include three reduced sub-graphs obtained based on a reduction of the first sub-graph 304A. A first reduced sub-graph included in the first set of reduced sub-graphs 306A may be selected as the current reduced sub-graph. The processor 204 may be configured to determine a second vector (for example, a second vector-1) based on the application of the determined graph kernel encoder on the first reduced sub-graph included in the first set of reduced sub-graphs 306A. Similarly, a second vector-2 and a second vector-3 may be determined based on the application of the determined graph kernel encoder on a second reduced sub-graph (included in the first set of reduced sub-graphs 306A) and a third reduced sub-graph (included in the first set of reduced sub-graphs 306A), respectively. Thus, the operation 810A may be executed on each of the reduced sub-graphs to obtain the second vector corresponding to each of the reduced sub-graphs.

At block 810B, a correlation coefficient may be determined between the selected extracted first sub-graph (i.e., the selected extracted first sub-graph 304A) and the current reduced sub-graph (i.e., the first reduced sub-graph included in the first set of reduced sub-graphs 306A), based on the determined first vector and the determined second vector (i.e., the second vector-1). In an embodiment, the processor 204 may be configured to determine the correlation coefficient between the first sub-graph 304A and the current reduced sub-graph (i.e., the first reduced sub-graph included in the first set of reduced sub-graphs 306A) based on the determined first vector and the determined second vector-1. The determined correlation coefficient may be a first correlation coefficient. The first correlation coefficient may be indicative of a similarity between the first sub-graph 304A and the first reduced sub-graph included in the first set of reduced sub-graphs 306A. Similarly, if the second reduced sub-graph is selected as the current reduced sub-graph, the processor 204 may determine a second correlation coefficient between the first sub-graph 304A and the second reduced sub-graph based on the determined first vector and the determined second vector-2. The second correlation coefficient may be indicative of a similarity between the first sub-graph 304A and the second reduced sub-graph included in the first set of reduced sub-graphs 306A. On the other hand, if the third reduced sub-graph is selected as the current reduced sub-graph, the processor 204 may determine a third correlation coefficient between the first sub-graph 304A and the third reduced sub-graph based on the determined first vector and the determined second vector-3. The third correlation coefficient may be indicative of a similarity between the first sub-graph 304A and the third reduced sub-graph included in the first set of reduced sub-graphs 306A. Thus, the operation 810B may be executed on each of the reduced sub-graphs to obtain the correlation coefficient between the extracted first sub-graph and each corresponding reduced sub-graph of the set of reduced sub-graphs.

At block 812, a reduced sub-graph may be selected, from the reduced sub-graph set (i.e., the first set of reduced sub-graphs 306A), as the closest reduced sub-graph for the extract-ID, based on the determined correlation coefficient. In an embodiment, the processor 204 may be configured to select a reduced sub-graph, from the reduced sub-graph set, as the closest reduced sub-graph corresponding to the selected extracted first sub-graph, based on the determined correlation coefficient. For example, the first reduced sub-graph may be selected as the reduced sub-graph, from the first set of reduced sub-graphs 306A, if the first correlation coefficient is determined to be greater than the second correlation coefficient and the third correlation coefficient. The second reduced sub-graph may be selected as the reduced sub-graph, from the first set of reduced sub-graphs 306A, if the second correlation coefficient is determined to be greater than the first correlation coefficient and the third correlation coefficient. The third reduced sub-graph may be selected as the reduced sub-graph, from the first set of reduced sub-graphs 306A, if the third correlation coefficient is determined to be greater than the first correlation coefficient and the second correlation coefficient.

In accordance with an embodiment, other extracted first sub-graphs (such as, the extracted first sub-graph 304B) may be selected from the set of first sub-graphs 304A . . . 304N, and a closest reduced sub-graph may be selected from corresponding set of reduced sub-graphs (such as, the second set of reduced sub-graphs 306B). The selection may be based on a correlation coefficient between the first sub-graph 304B and each reduced sub-graph of the second set of reduced sub-graphs 306B. Control may pass to end.

Although the flowchart 800 is illustrated as discrete operations, such as 802, 804, 806, 808, 810A-810B, and 812, the disclosure is not so limited. However, in certain embodiments, such discrete operations may be further divided into additional operations, combined into fewer operations, or eliminated, depending on the particular implementation without detracting from the essence of the disclosed embodiments.

Figure 9:
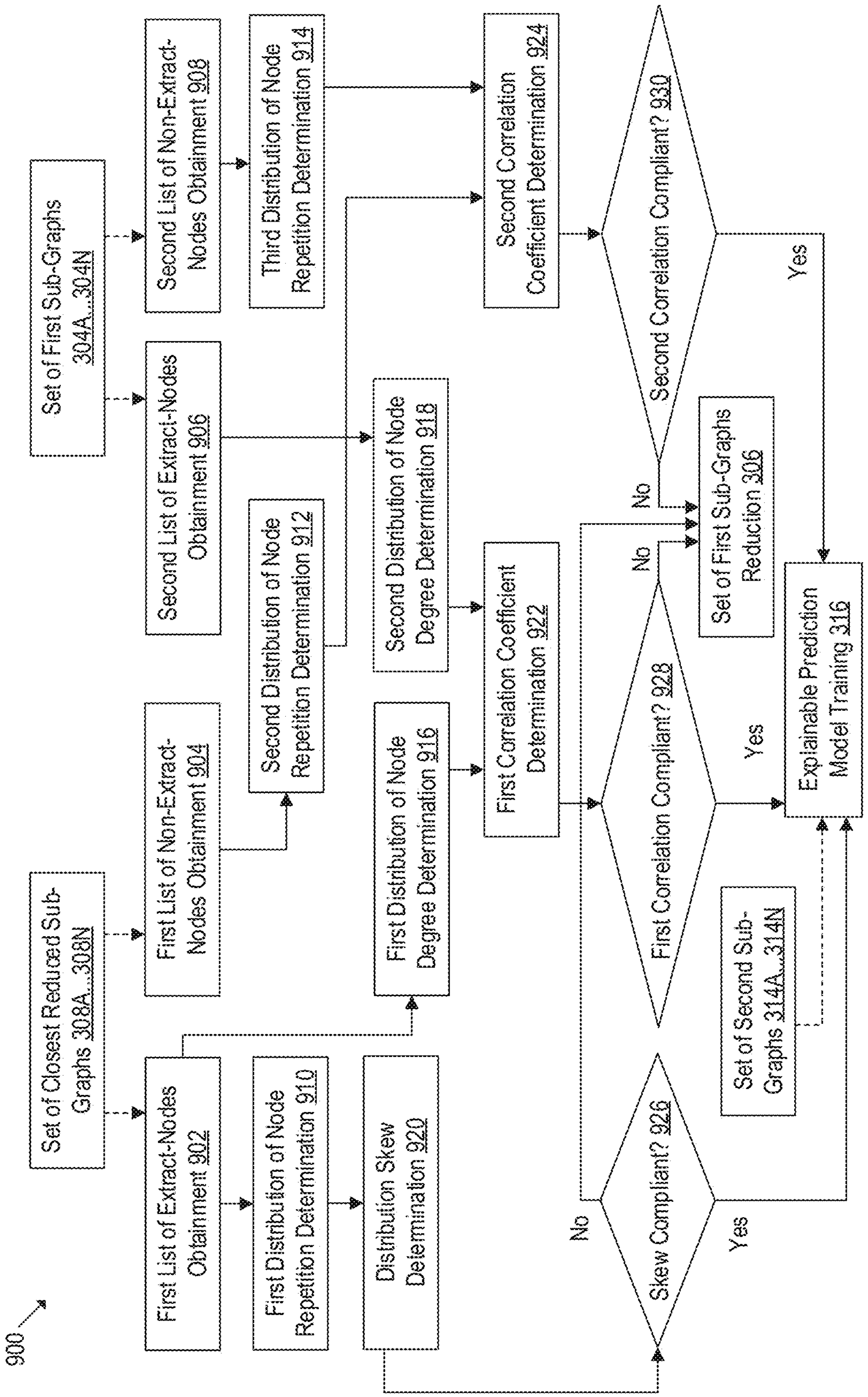
FIG. 9 is a diagram that illustrates an exemplary execution pipeline for coverage analysis of closest reduced subgraphs.

FIG. 9 is a diagram that illustrates an exemplary execution pipeline for coverage analysis of closest reduced subgraphs, in accordance with an embodiment of the disclosure. FIG. 9 is described in conjunction with elements from FIG. 1, FIG. 2, FIG. 3, FIG. 4, FIG. 5, FIG. 6A, FIG. 6B, FIG. 7A, FIG. 7B, and FIG. 8. With reference to FIG. 9, there is shown an execution pipeline 900. The exemplary execution pipeline 900 may include a sequence of operations that may be executed by the processor 204 of the electronic device 102 of FIG. 1 for coverage analysis of closest reduced subgraphs that correspond to the first sub-graphs of the set of first sub-graphs 304A . . . 304N. In the execution pipeline 900, there is shown a sequence of operations that may start from 902 and end at 930.

At 902, a first list of extract-nodes may be obtained based on the set of closest reduced sub-graphs 308A . . . 308N. In at least one embodiment, the processor 204 may be configured to obtain the first list of extract-nodes based on the set of closest reduced sub-graphs 308A . . . 308N. The extract-node in each closest reduced sub-graph of the set of closest reduced sub-graphs 308A . . . 308N may be selected and included in the first list of extract-nodes.

At 904, a first list of non-extract-nodes may be obtained based on the set of closest reduced sub-graphs 308A . . . 308N. In at least one embodiment, the processor 204 may be configured to obtain the first list of non-extract-nodes based on the set of closest reduced sub-graphs 308A . . . 308N. The non-extract-nodes in each closest reduced sub-graph of the set of closest reduced sub-graphs 308A . . . 308N may be selected and included in the first list of non-extract-nodes.

At 906, a second list of extract-nodes may be obtained based on the set of first sub-graphs 304A . . . 304N. In at least one embodiment, the processor 204 may be configured to obtain the second list of extract-nodes based on the set of first sub-graphs 304A . . . 304N. The extract-node in each extracted first sub-graph of the set of first sub-graphs 304A . . . 304N may be selected and included in the second list of extract-nodes.

At 908, a second list of non-extract-nodes may be obtained based on the set of first sub-graphs 304A . . . 304N. In at least one embodiment, the processor 204 may be configured to obtain the second list of non-extract-nodes based on the set of first sub-graphs 304A . . . 304N. The non-extract-nodes in each extracted first sub-graph of the set of first sub-graphs 304A . . . 304N may be selected and included in the second list of non-extract-nodes.

At 910, a first distribution of node repetition associated with the first list of extract-nodes may be determined. In at least one embodiment, the processor 204 may be configured to determine the first distribution of node repetition associated with the first list of extract-nodes. The first distribution of node repetition may be indicative of a repetition or distribution of information associated with each extract-node of the first list of extract-nodes in the closest reduced sub-graphs of the set of closest reduced sub-graphs 308A . . . 308N.

At 912, a second distribution of node repetition associated with the first list of non-extract-nodes may be determined. In at least one embodiment, the processor 204 may be configured to determine the second distribution of node repetition associated with the first list of non-extract-nodes. The second distribution of node repetition may be indicative of a repetition or distribution of information associated with each non-extract-node of the first list of non-extract-nodes in the closest reduced sub-graphs of the set of closest reduced sub-graphs 308A . . . 308N.

At 914, a third distribution of node repetition associated with the second list of non-extract-nodes may be determined. In at least one embodiment, the processor 204 may be configured to determine the third distribution of node repetition associated with the second list of non-extract-nodes. The third distribution of node repetition may be indicative of a repetition or distribution of information associated with each non-extract-node of the second list of non-extract-nodes in the first sub-graphs of the set of first sub-graphs 304A . . . 304N.

At 916, a first distribution of node degree associated with the extract-nodes of the first list of extract-nodes may be determined. In at least one embodiment, the processor 204 may be configured to determine the first distribution of node degree associated with the extract-nodes of the first list of extract-nodes. The processor 204 may determine a node degree of each extract-node of the first list of extract-nodes.

The degree of an extract-node may indicate a count of edges emanating from the extract-node. Based on the determined degree of each extract-node of the first list of extract-nodes, the processor 204 may determine the first distribution of node degree of the extract-nodes amongst the closest reduced sub-graphs of the set of closest reduced sub-graphs 308A . . . 308N. The first distribution of node degree may be indicative of variation of node degree of each extract-node of the first list of extract-nodes amongst the closest reduced sub-graphs of the set of closest reduced sub-graphs 308A . . . 308N.

At 918, a second distribution of node degree associated with the extract-nodes of the second list of extract-nodes may be determined. In at least one embodiment, the processor 204 may be configured to determine the second distribution of node degree associated with the extract-nodes of the second list of extract-nodes. The processor 204 may determine a node degree of each extract-node of the second list of extract-nodes. Based on the determined degree of each extract-node of the second list of extract-nodes, the processor 204 may determine the second distribution of node degree of the extract-nodes amongst the closest reduced sub-graphs of the extracted first sub-graphs of the set of first sub-graphs 304A . . . 304N. The second distribution of node degree may be indicative of variation of node degree of each extract-node of the second list of extract-nodes amongst first sub-graphs of the set of first sub-graphs 304A . . . 304N.

At 920, a distribution skew may be determined based on the first distribution of node repetition. In at least one embodiment, the processor 204 may be configured to determine the distribution skew based on the first distribution of node repetition. The distribution skew may be a first coverage metric of the set of coverage metrics. A higher distribution skew may be indicative an excess representation of information associated with some extract-nodes of the first list of extract-nodes and minuscule representation of information associated with other extract-nodes of the first list of extract-nodes, in the closest reduced sub-graphs of the set of closest reduced sub-graphs 308A . . . 308N.

At 922, a first correlation coefficient may be determined based on the first distribution of node degree and the second distribution of node degree. In at least one embodiment, the processor 204 may be configured to determine the first correlation coefficient based on the first distribution of node degree and the second distribution of node degree. The first correlation coefficient may be a second coverage metric of the set of coverage metrics. A lower value of the first correlation coefficient may indicate that the first distribution of node degree and the second distribution of node degree are dissimilar. On the other hand, a higher value of the first correlation coefficient may indicate that the first distribution of node degree and the second distribution of node degree are similar.

At 924, a second correlation coefficient may be determined based on the second distribution of node repetition and the third distribution of node repetition. In at least one embodiment, the processor 204 may be configured to determine the second correlation coefficient based on the second distribution of node repetition and the third distribution of node repetition. The second correlation coefficient may be a third coverage metric of the set of coverage metrics. A lower value of the second correlation coefficient may indicate that second distribution of node repetition and the third distribution of node repetition are dissimilar. On the other hand, a higher value of the second correlation coefficient may indicate that second distribution of node repetition and the third distribution of node repetition are similar.

At 926, a compliance of the distribution skew with a first coverage condition of the set of coverage conditions may be determined. In at least one embodiment, the processor 204 may be configured to determine whether the distribution skew is compliant with the first coverage condition of the set of coverage conditions. The distribution skew may be compliant with the first coverage condition if the distribution skew is less than a threshold distribution skew. The distribution skew may be less than the threshold distribution skew if the information associated with all extract-nodes of the first list of extract-nodes is uniformly distributed amongst in the closest reduced sub-graphs of the set of closest reduced sub-graphs 308A . . . 308N. On the other hand, the distribution skew may be greater than the threshold distribution skew (i.e., the distribution skew may not be compliant) if there is excess representation of information associated with some extract-nodes of the first list of extract-nodes in the closest reduced sub-graphs of the set of closest reduced sub-graphs 308A . . . 308N.

At 928, a compliance of the first correlation coefficient with a second coverage condition of the set of coverage conditions may be determined. In at least one embodiment, the processor 204 may be configured to determine whether the first correlation coefficient is compliant with the second coverage condition of the set of coverage conditions. The first correlation coefficient may be compliant with the second coverage condition if the first correlation coefficient is greater than a threshold first correlation coefficient. The first correlation coefficient may be determined to be greater than the threshold first correlation coefficient if the first distribution of node degree and the second distribution of node degree are similar. The processor 204 may determine that the reduction of the set of first sub-graphs 304A . . . 304N (resulting in the obtainment of the corresponding closest reduced sub-graphs of the set of closest reduced sub-graphs 308A . . . 308N) is biased in removing a threshold number of specific edges from the extracted first sub-graphs if the first correlation coefficient is less than the threshold first correlation coefficient (i.e., if the first correlation coefficient is not compliant).

At 930, a compliance of the second correlation coefficient with a third coverage condition of the set of coverage conditions may be determined. In at least one embodiment, the processor 204 may be configured to determine whether the second correlation coefficient is compliant with the third coverage condition of the set of coverage conditions. The second correlation coefficient be compliant with the third coverage condition if the second correlation coefficient is determined to be greater than a threshold second correlation coefficient. The second correlation coefficient may be greater than the threshold second correlation coefficient if the second distribution of node repetition and the third distribution of node repetition are similar. The processor 204 may determine that the reduction of the set of first sub-graphs 304A . . . 304N (resulting in the obtainment of the corresponding closest reduced sub-graphs of the set of closest reduced sub-graphs 308A . . . 308N) is biased in removing a significant number of specific nodes if the second correlation coefficient is greater than the threshold second correlation coefficient (i.e., if the second correlation coefficient is not compliant).

In accordance with an embodiment, the processor 204 may be configured to reinitiate the reduction (for example, operation 306, in FIG. 3) of the extracted set of first sub-graphs 304A . . . 304N if at least one of the distribution skew is not compliant, the first correlation coefficient is not compliant, or the second correlation coefficient is not compliant.

On the other hand, if the distribution skew is compliant, the first correlation coefficient is compliant, and the second correlation coefficient is compliant, then the set of second sub-graphs 314A . . . 314N may be obtained. The GXAI engine may use the set of second sub-graphs 314A . . . 314N to build the explainable prediction model 110 to predict inference results that are explainable. The information included in the set of second sub-graphs 314A . . . 314N may significantly contribute to the generation of prediction outputs (corresponding to connections between nodes of an input sub-graph). The training of the explainable prediction model 110 is described further, for example, in FIG. 3, at operation 316.

Figure 10:
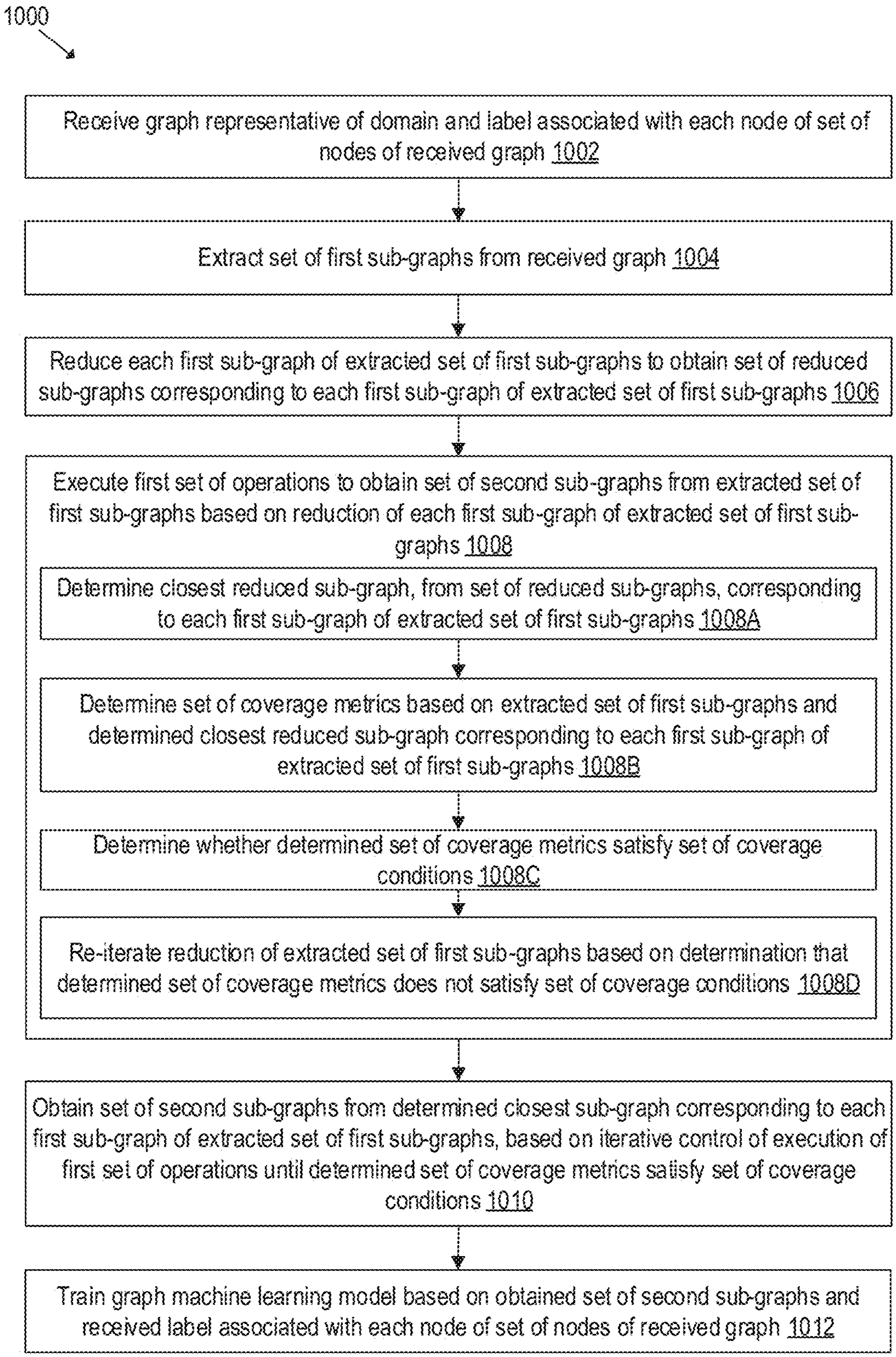
FIG. 10 is a diagram that illustrates a flowchart of an example method for graph reduction for explainable artificial intelligence (XAI)

FIG. 10 is a diagram that illustrates a flowchart of an example method for graph reduction for explainable Artificial Intelligence (XAI), in accordance with an embodiment of the disclosure. FIG. 10 is described in conjunction with elements from FIG. 1, FIG. 2, FIG. 3, FIG. 4, FIG. 5, FIG. 6A, FIG. 6B, FIG. 7A, FIG. 7B, FIG. 8 and FIG. 9. With reference to FIG. 10, there is shown a flowchart 1000. The method illustrated in the flowchart 1000 may start at 1002 and may be performed by any suitable system, apparatus, or device, such as, by the example electronic device 102 of FIG. 1, or the processor 204 of FIG. 2. Although illustrated with discrete blocks, the steps and operations associated with one or more of the blocks of the flowchart 1000 may be divided into additional blocks, combined into fewer blocks, or eliminated, depending on the particular implementation.

At block 1002, a graph (e.g., the graph 114) representative of a domain, and a label associated with each node of a set of nodes of the graph 114, may be received. In an embodiment, the processor 204 may be configured to receive the graph 114 representative of the domain, and the label associated with each node of the set of nodes of the graph 114. The reception of the graph is described further, for example, in FIG. 3 (at operation 302).

At block 1004, a set of first sub-graphs (e.g., the set of first sub-graphs 116A . . . 116N) may be extracted from the received graph 114. In an embodiment, the processor 204 may be configured to extract the set of first sub-graphs 116A . . . 116N from the received graph 114. The extraction of the set of first sub-graphs is described further, for example, in FIG. 3 (at operation 304).

At block 1006, each first sub-graph of the extracted set of first sub-graphs 116A . . . 116N may be reduced to obtain a set of reduced sub-graphs corresponding to each first sub-graph of the extracted set of first sub-graphs 116A . . . 116N. In an embodiment, the processor 204 may be configured to reduce each first sub-graph of the extracted set of first sub-graphs 116A . . . 116N to obtain a set of reduced sub-graphs corresponding to each first sub-graph of the extracted set of first sub-graphs 116A . . . 116N. The reduction of the extracted set of first sub-graphs is described further, for example, in FIG. 3 (at operation 306).

At block 1008, a first set of operations may be executed to obtain a set of second sub-graphs 120A . . . 120N from the extracted set of first sub-graphs 116A . . . 116N, based on the reduction of each first sub-graph of the extracted set of first sub-graphs 116A . . . 116N. In an embodiment, the processor 204 may be configured to execute the first set of operations to obtain the set of second sub-graphs 120A . . . 120N from the extracted set of first sub-graphs, based on the reduction of each first sub-graph of the extracted set of first sub-graphs 116A . . . 116N. The first set of operations may include, a block 1008A, a block 1008B, a block 1008C, and a block 1008D.

At block 1008A, a closest reduced sub-graph may be determined, from the set of reduced sub-graphs (for example, the set of reduced sub-graphs-1 118A. In an embodiment, the processor 204 may determine a closest reduced sub-graph from the set of reduced sub-graphs. The closest reduced sub-graph may correspond to each first sub-graph (for example, the first sub-graph 116A) of the extracted set of first sub-graphs 116A . . . 116N. The determination of the closest reduced sub-graph is described further, for example, in FIG. 3 (at operation 308).

At block 1008B, a set of coverage metrics may be determined based on the extracted set of first sub-graphs 116A . . . 116N and the determined closest reduced sub-graph corresponding to each first sub-graph of the extracted set of first sub-graphs 116A . . . 116N. In an embodiment, the processor 204 may determine the set of coverage metrics based on the extracted first sub-graphs 116A . . . 116N and the determined closest reduced sub-graph corresponding to each first sub-graph of the extracted set of first sub-graphs 116A . . . 116N. In an embodiment, the set of coverage metrics may be determined based on at least one of a first distribution of node repetition, a first distribution of node degree, a second distribution of node repetition, a second distribution of node degree, or a third distribution of node repetition. The set of coverage metrics may include a distribution skew, a first correlation coefficient, and a second correlation coefficient. The determination of the set of coverage metrics is described further, for example, in FIG. 3 (at operation 310).

At block 1008C, it may be determined whether the determined set of coverage metrics satisfy a set of coverage conditions. In an embodiment, the processor 204 may determine whether the determined set of coverage metrics satisfy the set of coverage conditions. The determination of whether the set of coverage conditions are satisfied is described further, for example, in FIG. 3 (at operation 312).

At block 1008D, the reduction of the extracted set of first sub-graphs 116A . . . 116N may be re-iterated, based on the determination that the determined set of coverage metrics do not satisfy the set of coverage conditions. In an embodiment, the processor 204 may re-iterate the reduction of the extracted set of first sub-graphs 116A . . . 116N, based on the determination that the determined set of coverage metrics do not satisfy the set of coverage conditions. In case, the set of coverage metrics do not satisfy the set of coverage conditions, the processor 204 may re-iterate the reduction of the extracted set of first sub-graphs, as described further, for example, in FIG. 3 (at operation 306). The closest reduced sub-graph, corresponding to each first sub-graph of the extracted set of first sub-graphs 116A . . . 116N, may be obtained when it is determined that the set of coverage metrics satisfy the set of coverage conditions.

At block 1010, the set of second sub-graphs 120A . . . 120N may be obtained from the determined closest reduced sub-graph corresponding to each first sub-graph of the extracted set of first sub-graphs 116A . . . 116N, based on an iterative control of the execution of the first set of operations until the determined set of coverage metrics satisfy the set of coverage conditions. In an embodiment, the processor 204 may be configured to obtain the set of second sub-graphs 120A . . . 120N from the determined closest reduced sub-graph corresponding to each first sub-graph of the extracted set of first sub-graphs 116A . . . 116N, based on an iterative control of the execution of the first set of operations until the determined set of coverage metrics satisfy the set of coverage conditions. Thus, when the closest reduced sub-graphs are obtained such that the set of coverage metrics satisfy the set of coverage conditions, the set of second sub-graphs 120A . . . 120N may be determined as the closest reduced sub-graphs. The determination of the set of second sub-graphs is described further, for example, in FIG. 3 (at operation 314).

At block 1012, a graph machine learning model may be trained based on the obtained set of second sub-graphs 120A . . . 120N and the received label associated with each node of the set of nodes of the received graph 114. In an embodiment, the processor 204 may be configured to train the graph machine learning model based on the obtained set of second sub-graphs 120A . . . 120N and the received label associated with each node of the set of nodes of the received graph 114. The training of the graph machine learning model is described further, for example, in FIG. 3 (at operation 316). Control may pass to end.

Although the flowchart 1000 is illustrated as discrete operations, such as 1002, 1004, 1006, 1008 (1008A-1008D), 1010, and 1012, the disclosure is not so limited. However, in certain embodiments, such discrete operations may be further divided into additional operations, combined into fewer operations, or eliminated, depending on the particular implementation without detracting from the essence of the disclosed embodiments.

Various embodiments of the disclosure may provide one or more non-transitory computer-readable storage media configured to store instructions that, in response to being executed, cause a system (such as, the example electronic device 102) to perform operations. The operations may include receiving a graph (e.g., the graph 114) representative of a domain, and a label associated with each node of a set of nodes of the received graph 114. The operations may further include extracting a set of first sub-graphs (e.g., the set of first sub-graphs 116A . . . 116N) from the received graph 114. The operations may further include reducing each first sub-graph of the extracted set of first sub-graphs 116A . . . 116N to obtain a set of reduced sub-graphs corresponding to each first sub-graph of the extracted set of first sub-graphs 116A . . . 116N. The operations may further include executing a first set of operations to obtain a set of second sub-graphs (e.g., the set of second sub-graphs 120A . . . 120N) from the extracted set of first sub-graphs 116A . . . 116N, based on the reduction of each first sub-graph of the extracted set of first sub-graphs 116A . . . 116N. The first set of operations may include determining a closest reduced sub-graph, from the set of reduced sub-graphs, corresponding to each first sub-graph of the extracted set of first sub-graphs 116A . . . 116N. The first set of operations may further include determining a set of coverage metrics based on the extracted set of first sub-graphs 116A . . . 116N and the determined closest reduced sub-graph corresponding to each first sub-graph of the extracted set of first sub-graphs 116A . . . 116N. The first set of operations may further include determining whether the determined set of coverage metrics satisfy a set of coverage conditions. Further, the first set of operations may include re-iterating the reduction of the extracted set of first sub-graphs 116A . . . 116N based on the determination that the determined set of coverage metrics do not satisfy the set of a coverage conditions. The operations may further include obtaining the set of second sub-graphs 120A . . . 120N from the determined closest reduced sub-graph corresponding to each first sub-graph of the extracted set of first sub-graphs 116A . . . 116N, based on an iterative control of the execution of the first set of operations until the determined set of coverage metrics satisfy the set of coverage conditions. The operations may further include training a graph machine learning model based on the obtained set of second sub-graphs 120A . . . 120N and the received label associated with each node of the set of nodes of the received graph.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, executed by a processor, comprising:

receiving a graph representative of a domain, and a label associated with each node of a set of nodes of the received graph;

classifying each node of the set of nodes into a classification based on the label associated with each node of the set of nodes;

generating an explanation providing a reason for the classification;

extracting a set of first sub-graphs from the received graph;

reducing each first sub-graph of the extracted set of first sub-graphs to obtain a set of reduced sub-graphs corresponding to each first sub-graph of the extracted set of first sub-graphs;

executing a first set of operations to obtain a set of second sub-graphs from the extracted set of first sub-graphs, based on the reduction of each first sub-graph of the extracted set of first sub-graphs, wherein the first set of operations includes:

determining a closest reduced sub-graph, from the set of reduced sub-graphs, corresponding to each first sub-graph of the extracted set of first sub-graphs, determining a set of coverage metrics based on the extracted set of first sub-graphs and the determined closest reduced sub-graph corresponding to each first sub-graph of the extracted set of first sub-graphs, determining whether the determined set of coverage metrics satisfy a set of coverage conditions, and re-iterating the reduction of the extracted set of first sub-graphs based on the determination that the determined set of coverage metrics does not satisfy the set of coverage conditions;

obtaining the set of second sub-graphs from the determined closest reduced sub-graph corresponding to each first sub-graph of the extracted set of first sub-graphs, based on an iterative control of the execution of the first set of operations until the determined set of coverage metrics satisfy the set of coverage conditions;

training a graph machine learning model based on the obtained set of second sub-graphs and the received label associated with each node of the set of nodes of the received graph;

obtaining a first list of extract-nodes and a first list of non-extract-nodes in the determined closest reduced sub-graph corresponding to each first sub-graph of the extracted set of first sub-graphs;

obtaining a second list of extract-nodes and a second list of non-extract-nodes based on the extracted set of first sub-graphs;

determining a first distribution of node repetition and a first distribution of node degree associated with the first list of extract-nodes;

determining a second distribution of node repetition associated with the first list of non-extract-nodes;

determining a second distribution of node degree associated with the second list of extract-nodes; and determining a third distribution of node repetition associated with the second list of non-extract-nodes, the set of coverage metrics is determined based on at least one of:

the first distribution of node repetition, the first distribution of node degree, the second distribution of node repetition, the second distribution of node degree, or the third distribution of node repetition;

training an explainable prediction model based on the graph machine learning model and the determined closest reduced sub-graph corresponding to each first sub-graph of the extracted set of first sub-graphs.

2. The method according to claim 1, wherein the set of first sub-graphs is extracted from the received graph based on at least one of a hop limit, a node type associated with the received graph, or a combination of the hop limit and the node type.

3. The method according to claim 1, wherein the set of reduced sub-graphs is obtained based on at least one of a count of nodes, a count of edges, or a set of hyperparameters associated with the extracted set of first sub-graphs.

4. The method according to claim 1, wherein the graph machine learning model corresponds to a graph explainable artificial intelligence (GXAI) engine.

5. The method according to claim 1, further comprising:

receiving an input sub-graph associated with the domain;

applying the trained explainable prediction model on the received input sub-graph; and determining a prediction output based on the application of the trained explainable prediction model.

6. The method according to claim 1, further comprising:

identifying extract-nodes and non-extract-nodes from the set of nodes of the received graph to obtain a list of extract-nodes;

selecting a first extract-node from the list of extract-nodes as an extract-identifier (ID);

adding a first ring to a ring-list associated with the extract-ID as a latest ring, wherein the first ring encloses the extract-ID;

executing a second set of operations to obtain a tuple associated with the extract-ID, wherein the second set of operations includes:

for each neighbor of each node that is enclosed by the latest ring:

determining whether the neighbor is enclosed by the latest ring, adding the neighbor outside the latest ring based on the determination that the neighbor is not enclosed by the latest ring, adding an edge associated with the added neighbor to an edge-list, adding a ring that encloses the added neighbor to the ring-list, and determining whether the latest ring is a last ring in the ring list, and setting the added ring as the latest ring and re-iterating the second set of operations, based on the determination that the latest ring is not the last ring in the ring-list; and obtaining the tuple including the extract-ID, the ring-list, and the edge-list, based on an iterative control of the execution of the second set of operations until the latest ring is determined as the last ring in the ring-list, wherein the extraction of the set of first sub-graphs is further based on the obtained tuple.

7. The method according to claim 1, further comprising:

selecting, from the extracted set of first sub-graphs, a first sub-graph associated with an extract-ID;

determining a ring node target of each ring in a ring list and a graph size target associated with the selected first sub-graph, wherein the ring node target of a corresponding ring is determined based on at least one of a size of the selected first sub-graph, the graph size target, or a ring weight of the corresponding ring, and the graph size target is determined based on at least one of the size of the selected first sub-graph, a target number of nodes, a target number of edges, or a combination of the target number of nodes and the target number of edges;

selecting a ring, from the ring list, as a current ring based on a determination that the selected current ring is unprotected, wherein nodes that are enclosed by protected rings are retained during reduction of the selected first sub-graph;

executing a third set of operations to obtain a reduced sub-graph of the set of reduced sub-graphs corresponding to the selected first sub-graph, wherein the third set of operations includes:

selecting a node enclosed by the selected current ring, wherein the selection of the node is a random selection, removing, from the selected first sub-graph, the selected random node and edges associated with the selected random node, determining, based on the removal, whether there exists any disconnected nodes in the selected first sub-graph, removing, from the selected first sub-graph, the disconnected nodes and edges associated with the disconnected nodes based on the determination of the existence of the disconnected nodes, determining whether there exists nodes that are farther from the extract-ID beyond a hop limit, removing, from the selected first sub-graph, the nodes beyond the hop limit and edges associated with the nodes, based on the determination of the existence of the nodes beyond the hop limit, determining whether the graph size target is satisfied based on the removal of the selected random node, the disconnected nodes, and the nodes beyond the hop limit, determining whether the current ring satisfies the determined ring node target, and re-selecting, from the selected first sub-graph, an unprotected ring subsequent to the selected current ring as the current ring, based on exit criteria including at least one of:

the determination that the graph size target is not satisfied, or the determination that the ring node target of the selected current ring is satisfied; and obtaining the reduced sub-graph from the selected first sub-graph, based on an iterative control of the execution of the third set of operations until the graph size target is satisfied.

8. The method according to claim 1, further comprising:

selecting, from the extracted set of first sub-graphs, an extracted first sub-graph;

selecting the set of reduced sub-graphs corresponding to the selected extracted first sub-graph as a reduced sub-graph set;

training a graph kernel encoder based on the extracted set of first sub-graphs;

determining a first vector based on an application of the graph kernel encoder on the selected extracted first sub-graph;

for each reduced sub-graph in the reduced sub-graph set:

determining a second vector based on an application of the graph kernel encoder on a current reduced sub-graph of the reduced sub-graph set, and determining a correlation coefficient between the selected extracted first sub-graph and the current reduced sub-graph, based on the determined first vector and the determined second vector; and selecting a reduced sub-graph, from the reduced sub-graph set, as the closest sub-graph corresponding to the selected extracted first sub-graph, based on the determined correlation coefficient.

9. The method according to claim 1, further comprising:

determining a distribution skew based on the first distribution of node repetition;

determining a first correlation coefficient based on the first distribution of node degree and the second distribution of node degree;

determining a second correlation coefficient based on the second distribution of node repetition and the third distribution of node repetition; and determining whether the determined distribution skew is compliant with a first coverage condition of the set of coverage conditions, the determined first correlation coefficient is compliant with a second coverage condition of the set of coverage conditions, and the determined second correlation coefficient is compliant with a third coverage condition of the set of coverage conditions, wherein the first coverage condition is satisfied if the determined distribution skew is less than a threshold distribution skew, the second coverage condition is satisfied if the determined first correlation coefficient is greater than a threshold first correlation coefficient, and the third coverage condition is satisfied if the determined second correlation coefficient is greater than a threshold second correlation coefficient.

10. One or more non-transitory computer-readable storage media configured to store instructions that, in response to being executed, cause an electronic device to perform operations, the operations comprising:

receiving a graph representative of a domain, and a label associated with each node of a set of nodes of the received graph;

classifying each node of the set of nodes into a classification based on the label associated with each node of the set of nodes;

generating an explanation providing a reason for the classification;

extracting a set of first sub-graphs from the received graph;

reducing each first sub-graph of the extracted set of first sub-graphs to obtain a set of reduced sub-graphs corresponding to each first sub-graph of the extracted set of first sub-graphs;

executing a first set of operations to obtain a set of second sub-graphs from the extracted set of first sub-graphs, based on the reduction of each first sub-graph of the extracted set of first sub-graphs, wherein the first set of operations includes:

determining a closest reduced sub-graph, from the set of reduced sub-graphs, corresponding to each first sub-graph of the extracted set of first sub-graphs, determining a set of coverage metrics based on the extracted set of first sub-graphs and the determined closest reduced sub-graph corresponding to each first sub-graph of the extracted set of first sub-graphs, determining whether the determined set of coverage metrics satisfy a set of coverage conditions, and re-iterating the reduction of the extracted set of first sub-graphs based on the determination that the determined set of coverage metrics does not satisfy the set of coverage conditions;

obtaining the set of second sub-graphs from the determined closest reduced sub-graph corresponding to each first sub-graph of the extracted set of first sub-graphs, based on an iterative control of the execution of the first set of operations until the determined set of coverage metrics satisfy the set of coverage conditions;

training a graph machine learning model based on the obtained set of second sub-graphs and the received label associated with each node of the set of nodes of the received graph;

obtaining a first list of extract-nodes and a first list of non-extract-nodes in the determined closest reduced sub-graph corresponding to each first sub-graph of the extracted set of first sub-graphs;

obtaining a second list of extract-nodes and a second list of non-extract-nodes based on the extracted set of first sub-graphs;

determining a first distribution of node repetition and a first distribution of node degree associated with the first list of extract-nodes;

determining a second distribution of node repetition associated with the first list of non-extract-nodes;

determining a second distribution of node degree associated with the second list of extract-nodes; and determining a third distribution of node repetition associated with the second list of non-extract-nodes, the set of coverage metrics is determined based on at least one of:

the first distribution of node repetition, the first distribution of node degree, the second distribution of node repetition, the second distribution of node degree, or the third distribution of node repetition;

training an explainable prediction model based on the graph machine learning model and the determined closest reduced sub-graph corresponding to each first sub-graph of the extracted set of first sub-graphs.

11. The one or more non-transitory computer-readable storage media according to claim 10, wherein the set of first sub-graphs is extracted from the received graph based on at least one of a hop limit, a node type associated with the received graph, or a combination of the hop limit and the node type.

12. The one or more non-transitory computer-readable storage media according to claim 10, wherein the set of reduced sub-graphs is obtained based on at least one of a count of nodes, a count of edges, or a set of hyperparameters associated with the extracted set of first sub-graphs.

13. The one or more non-transitory computer-readable storage media according to claim 10, wherein the graph machine learning model corresponds to a graph explainable artificial intelligence (GXAI) engine.

14. The one or more non-transitory computer-readable storage media according to claim 10, wherein the operations further comprise:

receiving an input sub-graph associated with the domain;

applying the trained explainable prediction model on the received input sub-graph; and determining a prediction output based on the application of the trained explainable prediction model.

15. An electronic device, comprising:

a memory storing instructions; and a processor, coupled to the memory, that executes the instructions to perform a process comprising:

receiving a graph representative of a domain, and a label associated with each node of a set of nodes of the received graph;

classifying each node of the set of nodes into a classification based on the label associated with each node of the set of nodes;

generating an explanation providing a reason for the classification;

extracting a set of first sub-graphs from the received graph;

reducing each first sub-graph of the extracted set of first sub-graphs to obtain a set of reduced sub-graphs corresponding to each first sub-graph of the extracted set of first sub-graphs;

executing a first set of operations to obtain a set of second sub-graphs from the extracted set of first sub-graphs, based on the reduction of each first sub-graph of the extracted set of first sub-graphs, wherein the first set of operations includes:

determining a closest reduced sub-graph, from the set of reduced sub-graphs, corresponding to each first sub-graph of the extracted set of first sub-graphs, determining a set of coverage metrics based on the extracted set of first sub-graphs and the determined closest reduced sub-graph corresponding to each first sub-graph of the extracted set of first sub-graphs, determining whether the determined set of coverage metrics satisfy a set of coverage conditions, and re-iterating the reduction of the extracted set of first sub-graphs based on the determination that the determined set of coverage metrics does not satisfy the set of coverage conditions;

obtaining the set of second sub-graphs from the determined closest reduced sub-graph corresponding to each first sub-graph of the extracted set of first sub-graphs, based on an iterative control of the execution of the first set of operations until the determined set of coverage metrics satisfy the set of coverage conditions;

training a graph machine learning model based on the obtained set of second sub-graphs and the received label associated with each node of the set of nodes of the received graph;

obtaining a first list of extract-nodes and a first list of non-extract-nodes in the determined closest reduced sub-graph corresponding to each first sub-graph of the extracted set of first sub-graphs;

obtaining a second list of extract-nodes and a second list of non-extract-nodes based on the extracted set of first sub-graphs;

determining a first distribution of node repetition and a first distribution of node degree associated with the first list of extract-nodes;

determining a second distribution of node repetition associated with the first list of non-extract-nodes;
determining a second distribution of node degree associated with the second list of extract-nodes; and
determining a third distribution of node repetition associated with the second list of non-extract-nodes,
the set of coverage metrics is determined based on at least one of:
the first distribution of node repetition,
the first distribution of node degree,
the second distribution of node repetition,
the second distribution of node degree, or
the third distribution of node repetition;
training an explainable prediction model based on the graph machine learning model and the determined closest reduced sub-graph corresponding to each first sub-graph of the extracted set of first sub-graphs.

* * * * *